(12) United States Patent
Ambrose et al.

(10) Patent No.: US 10,740,674 B2
(45) Date of Patent: Aug. 11, 2020

(54) LAYER-BASED OPERATIONS SCHEDULING TO OPTIMISE MEMORY FOR CNN APPLICATIONS

(71) Applicant: CANON KABUSHIKI KAISHA, Tokyo (JP)

(72) Inventors: Jude Angelo Ambrose, Blacktown (AU); Iftekhar Ahmed, Lane Cove North (AU); Yusuke Yachide, Bunkyo-ku (JP); Haseeb Bokhari, Kingsford (AU); Jorgen Peddersen, Kensington (AU); Sridevan Parameswaran, Kensington (AU)

(73) Assignee: Canon Kabushiki Kaisha, Tokyo (JP)

( * ) Notice: Subject to any disclaimer, the term of this patent is extended or adjusted under 35 U.S.C. 154(b) by 701 days.

(21) Appl. No.: 15/605,828

(22) Filed: May 25, 2017

(65) Prior Publication Data
US 2017/0344882 A1    Nov. 30, 2017

(30) Foreign Application Priority Data
May 31, 2016    (AU) ................................ 2016203619

(51) Int. Cl.
*G06N 3/04* (2006.01)
*G06N 3/08* (2006.01)
(Continued)

(52) U.S. Cl.
CPC .............. *G06N 3/08* (2013.01); *G06F 3/0604* (2013.01); *G06F 3/0653* (2013.01);
(Continued)

(58) Field of Classification Search
CPC ....................................................... G06N 3/04
(Continued)

(56) References Cited

U.S. PATENT DOCUMENTS

| 8,225,074 B2 | 7/2012 | Chakradhar et al. |
| 8,391,306 B2 | 3/2013 | Ito et al. |

(Continued)

OTHER PUBLICATIONS

Zhang, C., et al, "Optimizing FPGA-based Accelerator Design for Deep Convolutional Neural Networks", proceedings from FPGA, Feb. 22-24, 2015, pp. 161-170.
(Continued)

*Primary Examiner* — David R Vincent
(74) *Attorney, Agent, or Firm* — Canon U.S.A., Inc. IP Division

(57) ABSTRACT

A method of configuring a System-on-Chip (SoC) to execute a Convolutional Neural Network (CNN) by (i) receiving scheduling schemes each specifying a sequence of operations executable by Processing Units (PUs) of the SoC; (ii) selecting, a scheduling scheme for a current layer of the CNN; (iii) determining a current state of memory for a storage location in the SoC allocated for storing feature map data from the CNN; (iv) selecting, from the plurality of scheduling schemes and dependent upon the scheduling scheme for the current layer of the CNN, a set of candidate scheduling schemes for a next layer of the CNN; and (v) selecting, from the set of candidate scheduling schemes dependent upon the determined current state of memory, a scheduling scheme for the next layer of the CNN.

19 Claims, 18 Drawing Sheets

(51) Int. Cl.
*G06F 9/50* (2006.01)
*G06F 3/06* (2006.01)

(52) U.S. Cl.
CPC .............. *G06F 3/0673* (2013.01); *G06F 9/50* (2013.01); *G06N 3/0454* (2013.01)

(58) Field of Classification Search
USPC ..................................................... 706/15, 45
See application file for complete search history.

(56) References Cited

U.S. PATENT DOCUMENTS

| | | | |
|---|---|---|---|
| 8,832,004 B2 | 9/2014 | Kato et al. | |
| 10,140,572 B2* | 11/2018 | Bittner, Jr. | G06N 3/04 |
| 2016/0026912 A1* | 1/2016 | Falcon | G06N 3/0454 |
| | | | 706/25 |
| 2016/0379109 A1* | 12/2016 | Chung | G06N 3/04 |
| | | | 706/26 |
| 2017/0277658 A1* | 9/2017 | Pratas | G06F 17/153 |

OTHER PUBLICATIONS

Peemen, M., et al, "Memory-Centric Accelerator Design for Convolutional Neural Networks", Proceedings from ICCD, IEEE, Oct. 2013, pp. 13-19.

Krizhevsky, A., et al, "ImageNet Classification with Deep Convolutional Neural Networks", Advances in Neural Information Processing Systems 25, Proceedings from NIPS, Dec. 2012, pp. 1106-1114.

Karnowski, J.,"AlexNet visualization", https://jeremykarnowski.wordpress.com/2015/07/15/alexnet-visualization/ Accessed on Apr. 19, 2017.

Peeman, M., et al, "Inter-Tile Reuse Optimization Applied to Bandwidth Constrained Embedded Accelerators", Design, Automation & Test in Europe Conference & Exhibition (DATE), 2015, pp. 169-174.

Chen, T., et al, "DianNao: A Small-Footprint High-Throughout Accelerator for Ubiquitous Machine-Learning", ASPLOS 14, Mar. 1-5, 2014, pp. 269-284.

* cited by examiner

See 102 in Fig. 1
700

701

```
Scheduling_Scheme_One(){
    Num_PU = Total_PUs – 1
    for(i=0; i < outFM; i=i+1){
        for(j=0; j < inFM; j=j+Num_PU){
            load_input_FM(j, Num_PU)
            load_kernel_weights(i,j,Num_PU)
            for(k=0; k<out_y; k=k+1){
                for(l=0; l<out_x; l=l+1){
                    for(p=0; p<Num_PU; p=p+1)
                        //2D – Convolution
                        do_conv(j+p,i,k,l)
                    do_sum()
        }}}
        store_back_output_FM(i)
    }
}
```

Fig. 7

See 102 in Fig. 1
800

801

```
Scheduling_Scheme_Two(){
    Num_PU = Total_PUs – 1
    for(k=0; k<out_y; k=k+1){
        for(i=0; i < inFM; i=i+Num_PU){
            //load Num PU input FM bands
            load_input_FM_band(i, Num_PU)
            for(j=0; j < outFM; j=j+1){
                //Load one output FM row
                load_output_FM_row(j,k)
                load_kernel_weights(i,j,Num_PU)
                for(l=0; l<out_x; l=l+1){
                    for(p=0; p<Num_PU; p=p+1)
                        //2D- Convolution
                        do_conv(i+p, j, k, l)
                    do_sum()
                }
                //store output FM row in
                //input memory buffer
                store_back_output_FM_row(j,k)
}}}}
```

Fig. 8

LAYER-BASED OPERATIONS SCHEDULING TO OPTIMISE MEMORY FOR CNN APPLICATIONS

REFERENCE TO RELATED APPLICATION(S)

This application claims the benefit under 35 U.S.C. §119 of the filing date of Australian Patent Application No. 2016203619, filed 31 May 2016, hereby incorporated by reference in its entirety as if fully set forth herein.

TECHNICAL FIELD

The present invention relates to automation tools for designing digital hardware systems in the electronics industry and, in particular, to the mapping of Convolutional Neural Network (CNN) algorithms into a multi-accelerator System-on-Chip (SoC) based architecture.

BACKGROUND

The domain of Machine Learning (ML) has progressed by leaps and bounds in the last decade. Researchers are especially interested in applying the concepts of ML to solve the problem of object recognition. Many of the proposed machine-learning solutions are inspired by the complex neural processing capability of the human brain. A Convolution Neural Network (CNN) (also referred to as a CNN algorithm, described hereinafter in more detail with reference to FIG. 17) is an example of such a system, which has exhibited human like accuracy in relation to object recognition. CNNs are typically implemented using layers of interconnected processing neurons (also referred to as Processing Units or PUs or accelerators). Given the aforementioned high accuracy, CNNs have been used in some cutting-edge applications such as video surveillance, autonomous driving/navigation and large scale image search engines. It anticipated that CNN algorithms will be part of various embedded system products such as digital single-lens reflex (DSLR) cameras, mobile phones and other hand-held products.

CNNs emulate the human neural system by processing input image data through layers of strategically connected processing neurons. The layers use pre-calculated coefficients to transform the input data, thus extracting very specific features from the image. The number of coefficients and the amount of intermediate data (ie data produced at the end of each layer) can be huge, thus making the execution of CNN algorithms both computationally and memory intensive. Exacerbating this issue is the fact that in order to improve the accuracy of CNNs even further, researchers have proposed using deep learning algorithms that use even higher numbers of processing layers.

Research studies have shown that general purpose computing machines are not efficient for implementing CNN algorithms. Graphical Processing Units (GPUs) are a strong candidate for implementing CNN algorithms because GPUs, which are suitable for parallel computation, are well adapted to exploit the high level of data parallelism in the CNN algorithms. However, GPUs are not suitable for integration in low-power, low-cost embedded systems. Therefore, researchers have proposed various application-specific accelerators for use as neurons (ie PUs) when implementing CNN algorithms, proposing both Field Programmable Gate Array (FPGA) and Application Specific Integrated Circuit (ASIC) based multi-accelerator implementations.

FIG. 17 depicts an example 1700 of how CNN algorithms may be used in the applications referred to above, in order to introduce terminology used in the present description. In the example 1700 it is desired to process an image 1702 in order to extract a number of features using a CNN algorithm 1703.

The CNN algorithm (also referred to simply as a CNN) is made up of a number of layers 1704, 1705, . . . , 1706 of feature maps 1716. Feature maps in each layer are connected, as depicted by an arrow 1717, to feature maps of a subsequent layer. The number of connections in a particular CNN algorithm depends on the behaviour of the CNN algorithm in question. For example, in one CNN algorithm all the feature maps in a layer will be connected to all the feature maps of a subsequent layer. In a different CNN algorithm the first top half of the features maps in a layer will be connected to all the top half feature maps of a subsequent layer and the bottom half of the feature maps in a layer will be connected to all the bottom half features maps of a subsequent layer. The CNN algorithm 1703 has N layers, the last (ie Nth) layer of which produces the desired outputs 1707.

A process 1701 (also referred to as CNN process) comprises a sequence of process steps which, when embodied on a multi-accelerator System on a Chip (SoC) device or platform 1714 for example, execute the processing operation represented by the CNN 1703 to produce the outputs 1707 from the input 1702. In order to embody the process 1701 on the SoC 1714 it is necessary to generate, as depicted by an arrow 1719, based upon the process 1701 and applicable memory operations based on the memory architecture of the SoC platform 1714, a set 1708 of scheduling schemes each of which is mapped to (i.e. is identified as being suitable for or even optimal for use in executing) a respective layer of the SoC 1714. Thus for example, in FIG. 17 the scheduling scheme 1722 is mapped, as depicted by a dashed arrow 1723, to the processing unit (PU) 1711 of the SoC indicating that the PU 1711 of the SoC executes the scheduling scheme 1722 as indicated by the mapping 1723.

Accordingly, a scheduling scheme such as 1722 sends its set of operations to the available PU 1714 to process data in parallel and produce the output feature map such as 1705. Neighbouring layers of the CNN algorithm are processed together. That is, one layer of CNN algorithm (such as 1704) is received as an input, processed by the PUs (such as 1711,1712, . . . , 1721) of the SoC 1714 which will then produce feature maps of the next layer of the CNN algorithm as output (such as 1705). The produced layer (such as 1705) is then used as an input to generate feature maps of the subsequent layer (such as 1706) of the CNN algorithm using the available set of PUs in the SoC 1714.

The SoC 1714 is made up of a number of processing units (PUs) such as 1711, 1712, . . . , 1713 and 1721. The PUs in the SoC can be connected in any fashion or not connected at all (an example platform is depicted in 1714 where the PUs are connected with a forward link to the subsequent PUs). In general, there is no correspondence between the number of layers in the CNN 1703 and the number of PUs in the SoC 1714. Furthermore, in general there is no correspondence between the interconnections 1717 in the CNN 1703 and the interconnections 1718 in the SoC 1714. The CNN 1703 in FIG. 17 has N layers, the last (i.e. Nth) layer of which produces the desired outputs 1707. Each PU such as 1721 may have an associated local memory module 1720. The SoC may also have an associated shared memory module 1710 whose storage capacity is shared by the PUs in the SoC. In one example, local memory modules such as 1720 may constitute distributed shared memory. The SoC may also have an external memory module 1709 whose storage capacity is accessible by the PUs in the SoC.

As with all embedded systems, multi-accelerator designers are challenged to maximise the performance of these accelerators, while adhering to area, power and other design constraints. The high volume of data and the large number of computational steps involved in executing a CNN algorithm make the task of mapping the process (such as 1701) associated with the CNN (such as 1703) into such a multi-accelerator based System-on-Chip (SoC) such as 1714 even more difficult. There are numerous CNN algorithms such as 1703, and there are number of ways that the process such as 1701 associated with the CNN algorithms such as 1703 can be mapped to accelerator hardware such as 1714.

Scheduling schemes such as 1708, also referred to in this specification as memory schedules or merely as schedules, each of which includes a sequence of operations for executing a particular layer such as 1704 of the CNN algorithm on an associated PU (or associated set of PUs) such as 1712 of the SoC, are created 1719 based upon the CNN algorithm 1703 for execution on the multi-accelerator SoC 1714. The operations embodied in the scheduling schemes such as 1722 can be computation operations and/or memory operations. For example, "convolution" is a computation operation and "read from DRAM into SRAM" is a memory operation. The term "accelerator" and "Processing Unit (PU)" will be used interchangeably in this specification. PUs are also known as "Processing Element (PE)" in the industry. A unique combination of computation and communication sequences for executing a layer forms a scheduling scheme.

One prior-art approach for implementing a CNN algorithm such as 1703 on an SoC such as 1714 is to select a particular scheduling scheme such as 1722 for the entire CNN algorithm 1703 using design space exploration to determine the appropriate scheduling scheme. The same scheduling scheme is then applied to the PUs 1711, 1712, ..., 1713 of the SoC. Since different layers 1704, 1705, ..., 1706 in a CNN algorithm are different in terms of sizes and parameters, choosing one particular scheduling scheme such as 1722 may be suboptimal.

Another prior-art approach is to exhaustively explore and simulate all possible scheduling schemes 1708 against all the layers of the CNN algorithm 1701 This approach is time consuming and is typically not feasible within a reasonable time if the CNN algorithm is large.

In one known method, accelerators such as 1721 are customised for each layer such as 1704 of the CNN algorithm 1703 based on the level of unrolling and pipelining necessary to match the computation and communication demand of the CNN layer 1704. Since complex hardware structures are required to configure the accelerators such as 1721, uniform unroll factors are generally preferred for all the layers of the CNN algorithm.

In another known method, loop bounds for processing the CNN algorithm are determined based on the size of the given buffers such as 1720 in the SoC 1714, to reduce accesses to the external memory 1709. The utilised scheduling schemes have parameterisable loop bounds for each layer of the CNN algorithm, but have the same operations sequence.

In another known method, optimal buffer sizes for buffers such as 1709 are determined for each layer such as 1704, 1705, ... 1706 of the CNN algorithm using the same scheduling scheme for all the layers 1704, 1705, ... 1706. Selecting the same schedule such as 1722 for all the layers in the CNN algorithm is suboptimal with respect to reducing design costs such as external memory accesses (term "DRAM accesses" will be interchangeably used with the term "external memory accesses"), execution time of the CNN algorithm and the size of the local memory such as 1720 (term "SRAM size" will be interchangeably used with the term "local memory size").

Finding the best scheduling schemes 1708 for the entire CNN algorithm 1703 in a feasible time frame can have a significant impact on the overall exploration time, which greatly impacts the design efficiency and time to market of the embedded system.

SUMMARY

It is an object of the present invention to substantially overcome, or at least ameliorate, one or more disadvantages of existing arrangements.

Disclosed are arrangements, referred to as Layer Dependency Based Scheduling (LDBS) arrangements in this description, which seek to address the above problems by assigning scheduling schemes to System-On-Chip SoC accelerators based upon dependencies between scheduling schemes and opportunity costs of particular mappings. Neighbouring layers of the CNN algorithm are processed together. Accordingly one layer of CNN algorithm is received as an input mapped on PUs for execution which will then produce the next layer of CNN algorithm as output. The produced layer is then used as an input to generate the subsequent layer of CNN algorithm.

According to a first aspect of the present invention, there is provided a method of configuring a multi-accelerator System-on-Chip (SoC) to execute a Convolutional Neural Network (CNN), the method comprising the steps of: (i) receiving a plurality of scheduling schemes each specifying a sequence of operations executable by Processing Units (PUs) of the SoC; (ii) selecting, from the plurality of scheduling schemes, a scheduling scheme for a current layer of the CNN; (iii) determining, for the current layer of the CNN, a current state of memory for a storage location allocated to the PUs of the SoC for storing feature map data from the CNN; selecting, from the plurality of scheduling schemes and dependent upon the scheduling scheme for the current layer of the CNN, a set of candidate scheduling schemes for a next layer of the CNN; and (v) selecting, from the candidate scheduling schemes dependent upon the determined current state of memory in the SoC for the current layer of the CNN, a scheduling scheme for the next layer of the CNN; wherein the determination of the scheduling scheme for the current layer of the CNN and the determination of the scheduling scheme for the next layer of the CNN configure the SoC for execution of the CNN.

According to another aspect of the present invention, there is provided an apparatus for implementing any one of the aforementioned methods.

According to another aspect of the present invention there is provided a computer program product including a computer readable medium having recorded thereon a computer program for implementing any one of the methods described above.

Other aspects of the invention are also disclosed.

BRIEF DESCRIPTION OF THE DRAWINGS

One or more embodiments of the invention will now be described with reference to the following drawings, in which:

FIG. 7 is an example for a frame based scheduling scheme;

FIG. 8 is an example for a band based scheduling scheme;

DETAILED DESCRIPTION INCLUDING BEST MODE

Context

Figure 1:
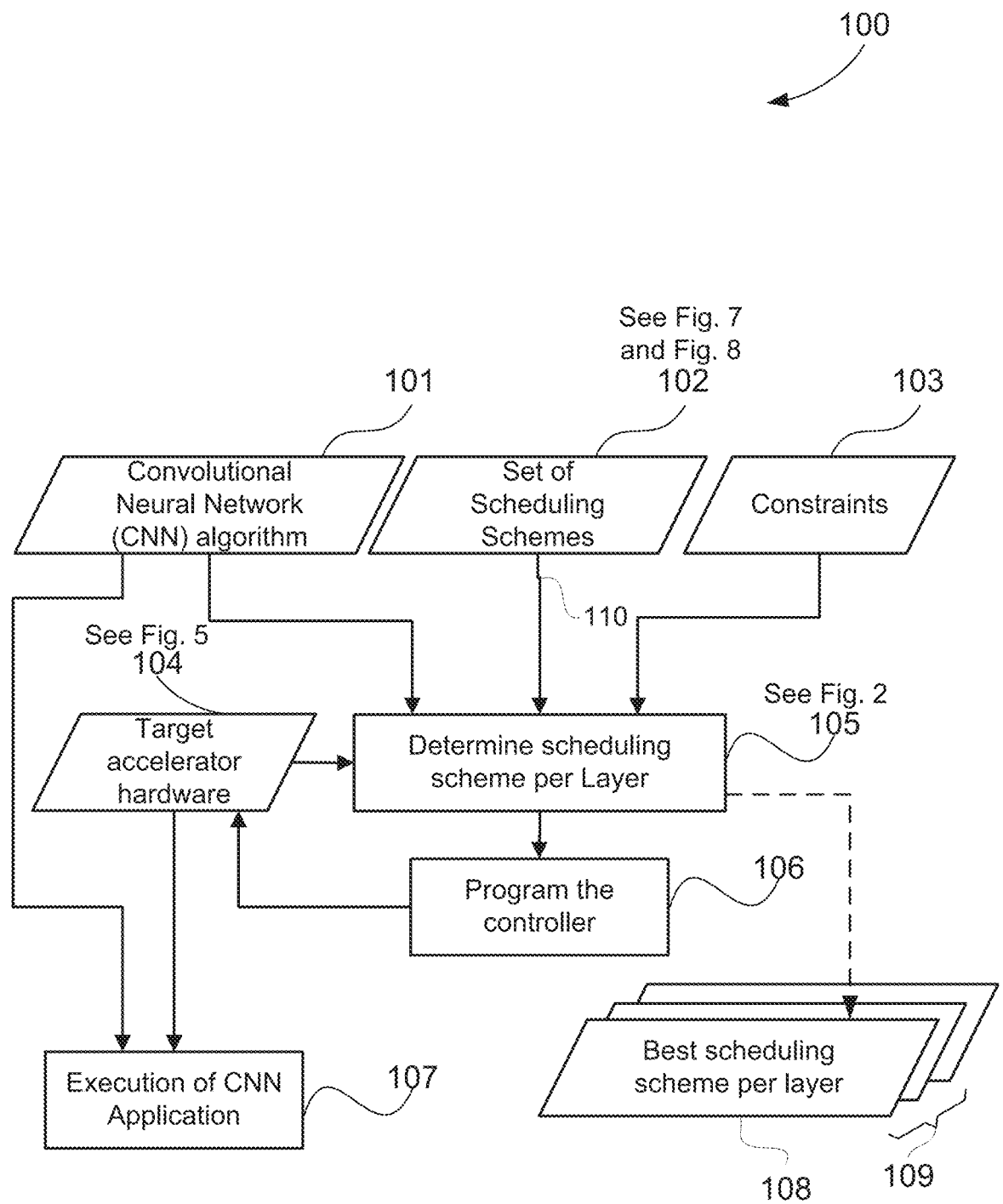
FIG. 1 is a schematic flow diagram illustrating a method to execute the CNN algorithm in the target accelerator hardware.

Where reference is made in any one or more of the accompanying drawings to steps and/or features, which have the same reference numerals, those steps and/or features have for the purposes of this description the same function(s)) or operation(s), unless the contrary intention appears.

It is to be noted that the discussions contained in the "Background" section and the section above relating to prior art arrangements relate to discussions of documents or devices which may form public knowledge through their respective publication and/or use. Such discussions should not be interpreted as a representation by the inventors or the patent Applicant that such documents or devices in any way form part of the common general knowledge in the art.

Finding the best scheduling schemes 1708 for each layer 1704 of a CNN algorithm 1703 in order to execute on the SoC 1714 using simulations is time consuming. A best selection of the scheduling schemes 1708 to the layers 1704, 1705 and 1706 of the CNN algorithm 1703 is expected to be the best mapping of the CNN algorithm 1703 to be executed in the SoC 1714. The scheduling scheme is for the layers of the CNN algorithm and not for the SoC. The SoC architecture and PUs are given, and the scheduling scheme utilises the SoC resources in order to place memory operations and parallel operations.

The best scheduling scheme 1722 for the particular CNN algorithm layer 1704 is defined as the scheduling scheme which satisfies given criteria with minimal design costs to execute on the SoC 1714 for the layer 17104 in question. The criteria and design costs are for the entire SoC. For example, the best scheduling schemes can be ones which require a local shared memory (such as 1710) whose size is within a given constraint while consuming minimal accesses to the external memory 1709 thus resulting in a smaller execution time for the entire SoC. In order to reduce the number of simulations but still be able to find the best selection of scheduling schemes to layers of the CNN algorithm, an estimation method is required in order to accurately predict the design costs, such as the required local memory size, the external memory accesses and the execution time of the CNN algorithm 1703. The term "execution time" means the execution time of the CNN algorithm 1703. The disclosed LDBS arrangements enable rapid prediction of the design costs when selecting the scheduling schemes 1708 to the layers 1704, 1705 and 1706 of the CNN algorithm 1703, by considering the resources (such as accelerators 1711 and connectivity 1718 between accelerators) available in the given SoC 1714, so that the exploration and selection for mapping can be quickly performed with high accuracy.

From a terminology perspective the term "Mapping" relates to mapping the CNN algorithm to the SoC. The term "selection" relates to the association between scheduling schemes and the CNN algorithm

Overview of the LDBS Arrangement

A general CNN algorithm such as 1703 typically comprises three types of computational stages, where each stage such as 1724 can contain one or more of 1) A Convolution Layer (such as 1704 for example), 2) A Pooling Layer (not shown), and, 3) A Classifier Layer (such as 1705 for example).

A convolution layer is responsible for extracting different features from a given input image to form a data vector. Multiple convolutions can be used in series for higher accuracy in image detection. A pooling layer can be used after the convolution layer to reduce the size of the data vector. The output from the convolution layer or the pooling layer is input to a classifier layer which identifies the image using numerical scoring. The convolution layer is most demanding in terms of execution time and memory operations.

Figure 6:
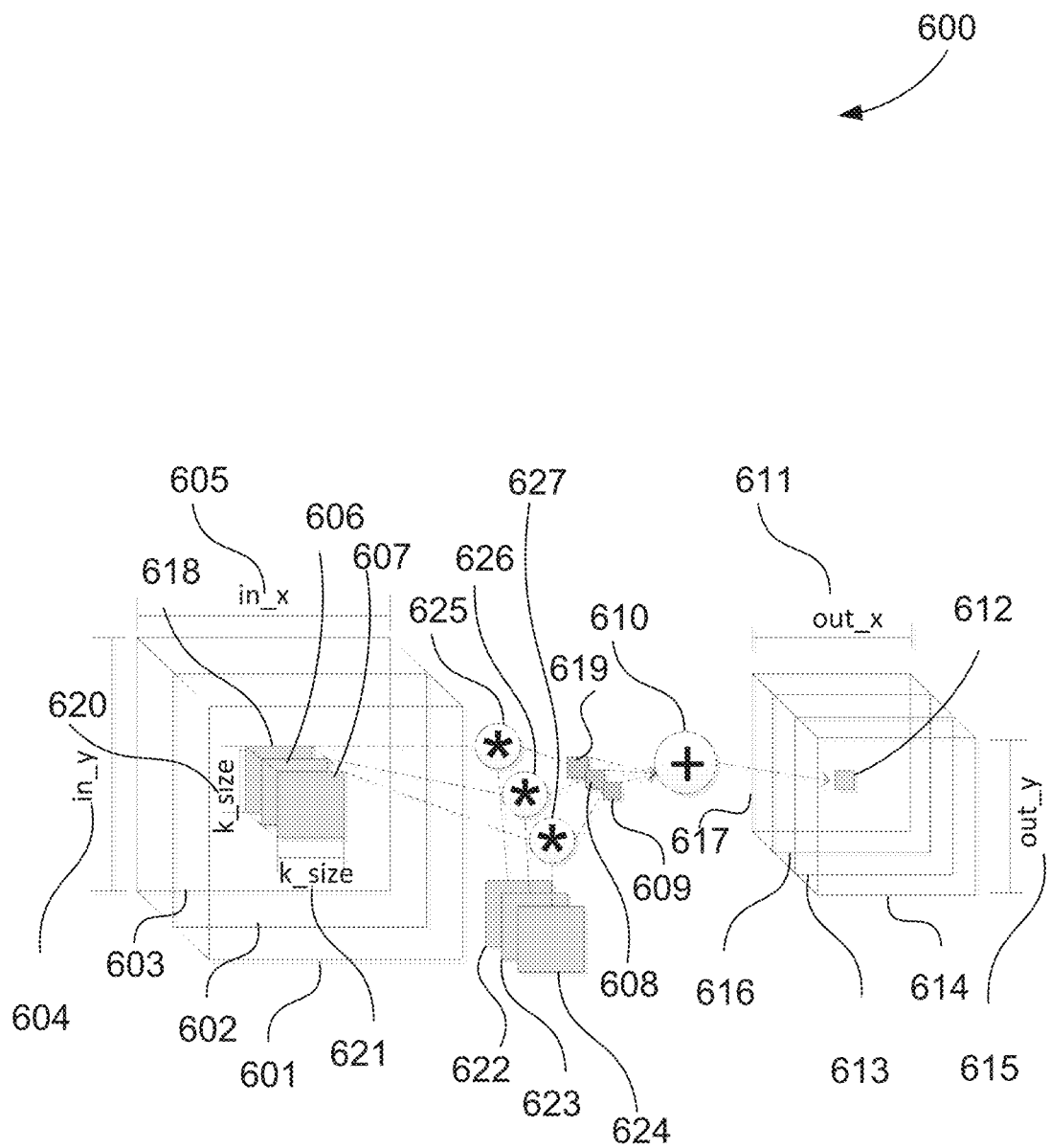
FIG. 6 is an example processing structure of the neighbouring convolutional layers in a CNN algorithm.

FIG. 6 shows the computational structure of a convolution layer (such as 1704) in a Convolutional Neural Network CNN algorithm (such as 1703). The input to the convolution layer is made up of multiple two dimensional input feature maps 601, 602, 603 (referred to as "FM"s) and the output is made up of multiple output feature maps 614, 613, 616, 617. In this example the three input FMs, 601, 602 and 603 are of width in_x (ie 605) and height in_y (ie 604). The four output FMs, 613, 614, 616 and 617 are of width out_x (ie 611) and height out_y (ie 615).

In order to generate one pixel in one of the output FMs, such as 612, two dimensional kernels of each input FM (such as kernels 607, 606 and 618 of FM's 601, 602 and 603 respectively) are convolved (using convolution operators 627, 626 and 625) with corresponding kernel weights (such as 622, 623 and 624) to form respective pixel outputs (such as 609, 608 and 619). The pixel outputs (such as 609, 608 and 619) are summed (by a summer denoted as 610) together to create an output pixel in the output feature map (such as pixel output 612 of output FM 614).

In the present example, the kernels 606, 607, . . . , 618 are of equal size k_size (i.e. 620) x k_size (ie 621). The outputs of the convolutions ie 609, 608 and 619 are summed at a summer 610. For most CNN algorithms, the number of input FMs and output FMs is measured in the hundreds, making layer operations very computationally intensive. Similarly, there is a significant amount of data movement involved during layer computations, making on/off-chip data management (i.e., local and external memory) an equally complex process.

An Example CNN Implementation

A typical CNN algorithm contains a series of convolution and pooling layers. A CNN algorithm can consist of 5 different convolution layers and each of these layers has a unique set of parameters. As observed by researchers, due to varying parameters and a fixed scheduling scheme across all layers of the CNN algorithm, each layer can have varying performance and memory access patterns for a given hardware platform. The present disclosure departs from the current practice of designing hardware for a given scheduling scheme. Instead, the present disclosure builds on the concept of having a flexible architecture and then selecting the best possible scheduling scheme for each layer from a given set of scheduling schemes. The inner two loops implement the 2-D convolution. The target accelerator treats the 2-d convolution operations as one atomic operation. However, the programmer has the flexibility to schedule the outer four loops in different combinations, resulting in different scheduling schemes. Each scheduling scheme will have an impact on execution time, memory accesses and on-chip memory size requirement. Therefore the goal is to choose one of the scheduling schemes from a predefined set of scheduling schemes for each layer based on the layer parameters.

Figure 5:
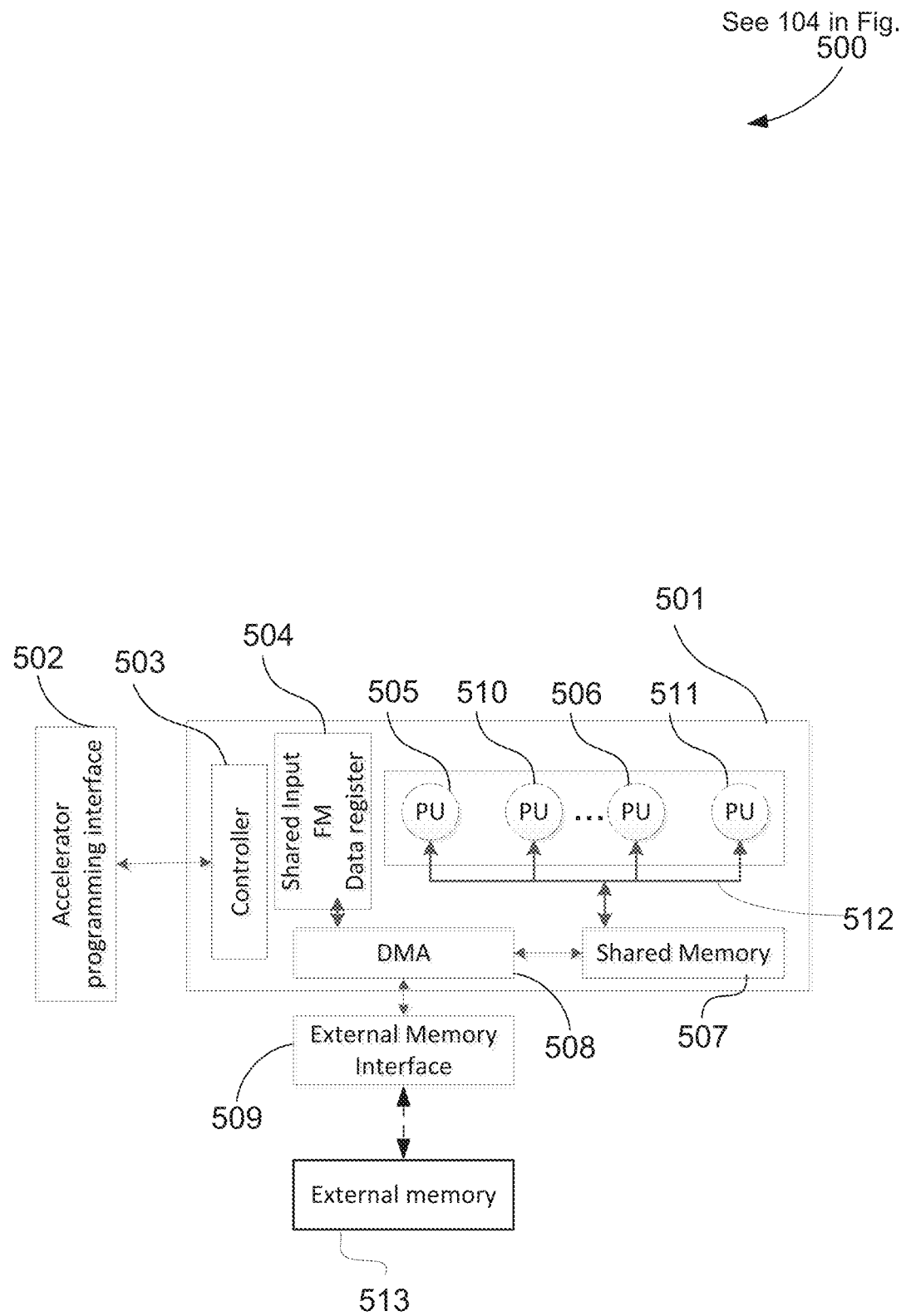
FIG. 5 is an example block diagram of a multi-accelerator SoC architecture.

FIG. 5 is a particular example block diagram 500 of a multi-accelerator SoC 501 (also see 1714). A CNN algorithm is executed by the multi-accelerator based SoC 501 by inputting the appropriate scheduling schemes such as 1708 to the SoC 501 via a high speed interface 502. The multi-accelerator based SoC 501 has multiple accelerators or processing units (PUs) 505, 510, 506 and 511. The PUs, 505, 510, 506 and 511, can either communicate directly with each other (as depicted by a communication path 512) or via a shared memory 507.

A controller 503 is responsible for managing the computation and communication activities within the multi-accelerator SoC 501. The controller 503 is programmed, using a general purpose computer 1200 via the interface 502 (which is also referred to as the accelerator programming interface 502) and the I/O interface 1208 for example, thereby providing scheduling scheme instructions for the PUs in the SoC 501. The controller 503 has a direct link (not shown) with each PU in order to issue instructions to the PU in question. Once the PU in question finishes executing the instruction, the PU notifies the Controller 503 using an interrupt.

In addition to issuing computation instructions to the PUs, the controller 503 manages data transfers between the Shared Memory 507 and an external memory 513 by programming a Direct Memory Access (DMA) module 508. The external memory 513 is accessed via an external memory interface 509.

The controller 503 can be programmed to execute different scheduling schemes. Accessing the external memory 513 (which may be a Double Data Rate ie "DDR" memory) repeatedly can cause significant latency and power penalty. To alleviate this problem, the preferred accelerator in the LDBS arrangement 500 is provided with the Shared Memory (SM) 507 in order to minimize accesses to the external memory 513. The SM 507 may be configured in different ways. In one LDBS arrangement, local memory modules such as 1720 are associated with each PU having a shared local memory 1710. In another LDBS arrangement, no distributed or individual local memory modules per PU are provided, and all PUs access a common local shared memory such as 507.

In a preferred LDBS implementation at the request of the controller module 503 the DMA module 508 transfers data between the SM 507 and the external memory 513. The PUs 505, 510, 506, 511, . . . , can directly access the contents of the SM 507. The size of the SM 507 is constrained depending upon various factors such as area, performance and power. The DMA module 508 enables efficient data transfer between the SM 507 and the external memory 513.

The controller 503 issues a series of DMA requests depending upon how the scheduling schemes associated with the CNN algorithm are mapped onto the SoC 501. A Shared Input FM Data Register 504 is utilised in order to broadcast data signals to all the PUs 550, 510, 506, 511. In a preferred LDBS implementation, each PU such as 505, 510, 506 and 511 in the SoC 501 is able to perform all the required operations, such as convolution and pooling. However the depicted architecture can also contain function specific and heterogeneous PUs (i.e., PUs supporting only convolution and pooling separately), restricting the possible scheduling schemes which can be applied. In a preferred LDBS implementation, each PU consists of a series of multipliers and adders to implement the basic convolution operation. Having multiple multipliers enables processing multiple pixels from an input FM and a kernel weight matrix in parallel. The network of multipliers and adders can be configured to perform accumulation operations when needed. A special "pool" unit is included to perform pooling layer operation.

In one LDBS arrangement the PUs expect input data to be stored in the SM 507. In case of limited SM 507, a scheduling scheme should be applied to bring input FMs or kernel weights from the external memory 513 to the on-chip memory 507 before processing.

Figure 17:
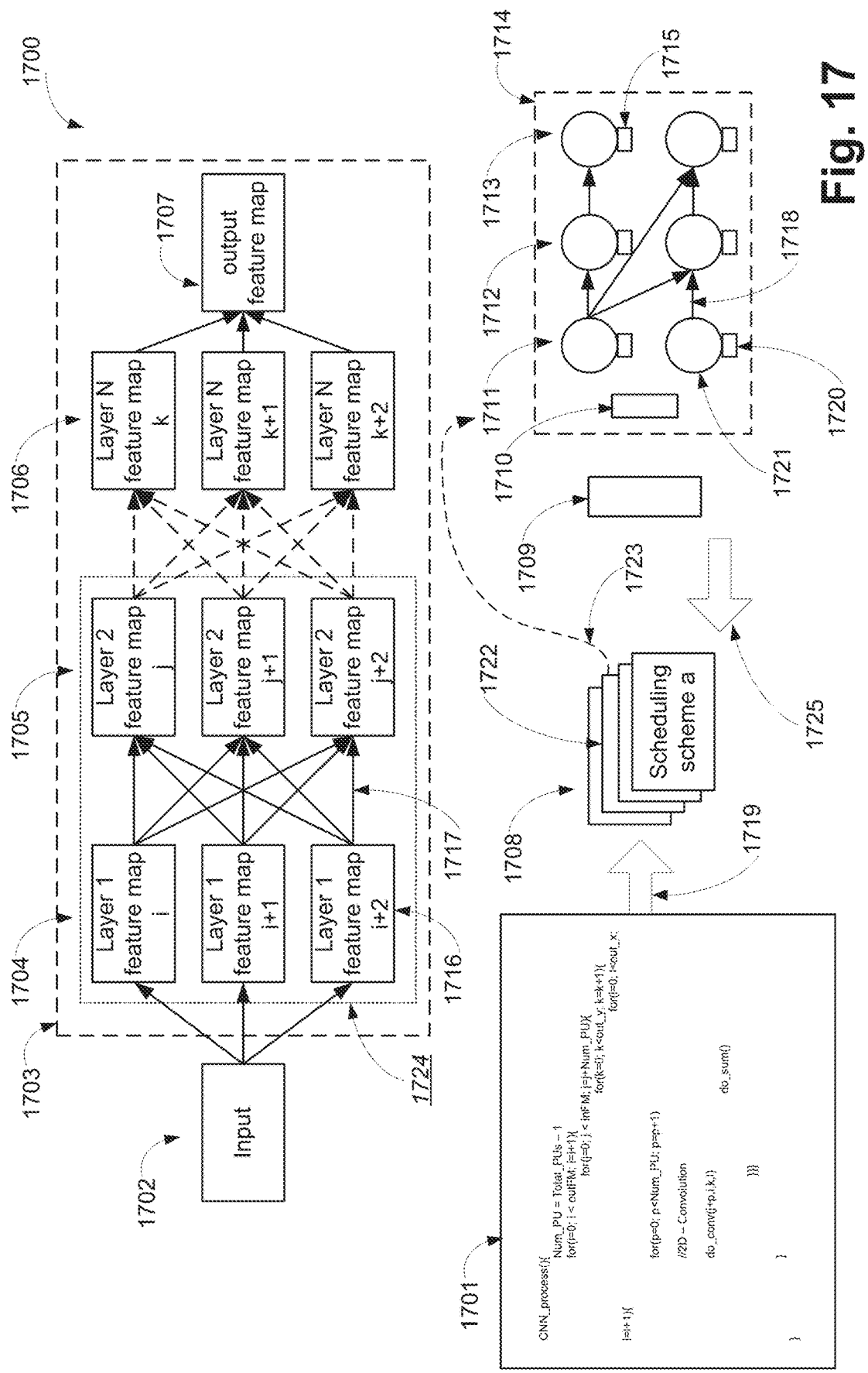
FIG. 17 is a schematic block diagram illustrating how a CNN algorithm can be implemented.

When implementing the LDBS arrangements using the architecture depicted in FIG. 17 it is noted that the sizes of the memory modules 1720, 1710 are typically fixed when the SoC 1714 is fabricated. The amount of memory required by each layer to execute the CNN algorithm 1703 is however defined by the scheduling schemes 1708. The memory management used by the LDBS arrangements in order to accommodate the memory requirements specified by the scheduling schemes using the memory modules 1720, 1710 in the SoC and the external memory 1709 is described hereinafter in more detail with reference to FIGS. 3, 9, and 10.

An Example Architecture Implementation

Each PU typically has a series of multipliers and adders to implement the basic convolution operation. Having multiple multiplier units enables the processing of multiple pixels from input FM and kernel weight matrix in parallel. There are typically three small buffers in each PU: Data Buffer, Weight Buffer and Output Buffer. The input image can be fed to the arithmetic unit from three sources namely: 1) Shared Input Data Register, 2) PU's Data Buffer, and, 3) Incoming FIFO links. The contents of the Data Buffer and the Weight Buffers are typically loaded from accelerator's shared memory. The network of multipliers and adders can be configured to only perform accumulation operation on incoming data from FIFO links. A special POOL unit is included to perform pooling layer operation.

A candidate problem definition is as follows:

Given:
1) S, a set of scheduling schemes
S={S1, S2, . . . , SN}, where N is total number of scheduling schemes
2) L, a set of layers in a target CNN application.
L={L1, L2, . . . , LM}, where M is total number of layers
3) The target hardware accelerator with a fixed set of PUs
4) CNN algorithm execution time constraint, Tc
5) Architecture memory size constraint, Mc Find:
LS', a set of scheduling scheme for each layer
LS'={LS$_1$', LS$_2$', . . . , LS$_M$'}, where M is total number of layers, and, LS$_1$' ∈ S Design Metrics:

$$\text{Execution time} = \sum_{i=1}^{M} \text{Layer\_exec\_time}(L_i, LS_i')$$

$$\text{DRAM accesses} = \sum_{i=1}^{M} \text{Layer\_DRAM\_access}(L_i, LS_i')$$

On chip Memory Size=Max(layer_mem_size($L_i$, $LS_i$')), for i ∈ {1, 2, . . . , M}

Where, "execution time" refers to the time taken to execute the CNN algorithm by executing all the layers, hence the summation of the individual execution time of layers. The "Layer_exec_time( )" function returns the execution time to execute the layer when executed using scheduling scheme $LS_i$'. The term "DRAM accesses" refers to the number of memory accesses going to the external memory, which is computed by summing the DRAM accesses incurred in each layer, using the function "Layer_DRAM_access( )", which returns the number of DRAM accesses for the layer $L_i$ when executed using scheduling scheme $LS_i$'. The on chip memory size is calculated as the maximum of the local memory consumed across all the layers. The "Layer_mem_size( )" function returns the memory size of each layer $L_i$ when executed using scheduling scheme $LS_i$'.

Such That:

Minimise the number of DRAM accesses and, Execution time is less than or equals to Tc and On-Chip memory size is less than or equals to Mc.

The need to minimize external memory accesses is based upon two reasons. First, due to a limited external memory bandwidth, it is desirable to minimize the impact of memory accesses which are initiated by an accelerator since it will adversely impact the memory latency for memory accesses initiated by other on-chip components such as the general purpose processor.

Second, the external memory accesses consume far more energy than on-chip memory accesses. Although having an on-chip memory can help in reducing off-chip memory accesses, the size of on-chip memory must also adhere to an area constraint. On the other hand, image processing applications are often executed with a real-time execution constraint such as frames per second. From the formal definition of this problem, it is possible to choose a scheduling scheme from a set S for each layer in set L. Therefore the size of design space is O(MN), where M and N are the sizes of sets L and S, respectively. However, as all the layers are processed independently, the design space for the metrics can be populated in O(M:N) steps using either estimation methods or simulations.

FIG. 7 shows a fragment of pseudo-code depicting an example procedure used by a scheduling scheme in order to execute the convolution layer. At a given time, the scheduling scheme "Scheduling_Scheme_One( )" in 701 only operates upon a single output FM. The depicted scheduling scheme 701 exploits parallelism by processing multiple input FMs in multiple PUs, where the Num_PU is referred to as the number of processing elements available in the multi-accelerator SoC 501. In a preferred LDBS implementation the sum operation is performed by a dedicated PU, hence the reason for deducting one from the total number of PUs (i.e., Num_PU=Total_PUs−1).

Note that an outFM loop is the outer-most loop and therefore the partial output data is never brought back to the local memory. However, the loop for inFM is executed for each output FM and the same input data is brought in repeatedly. Therefore, this example scheduling scheme 701 has higher data reuse for output FM data than input FM data. Also, the kernel weights are only brought in local memory once, thus resulting in a high data reuse.

The convolution operation do_conv( ) in a Num_PU loop is executed in parallel on PUs allocated for convolution operation, FIG. 8 shows a fragment of pseudo-code depicting an example procedure used by a scheduling scheme in order to execute processes the input FM in small portions called band, unlike "Scheduling_Scheme_One( )" in 701 which processes input/output FM in one go. A band data should be sufficient to produce a single row of output FM. As shown in 801, instead of processing the complete input FM, only input FM bands are processed. Once a certain set of input FM bands are processed, one row of data for each output FM is generated. This scheduling scheme 801 exploits parallelism by processing multiple input FM bands in multiple PUs.

The scheduling scheme moves to a next set of input FM bands once the current set of input FM hands has been processed with kernel weights. This "Scheduling_Scheme_Two( )" 801 enables keeping the input and output data in SM 507, since the data is processed in smaller bands. In both the above scheduling scheme examples 701 and 801, the PUs are allowed execution only after the data is brought to the SM 507 and the remaining output data which cannot be stored in the SM 507 (since the SM 507 is already full) is written to the external memory 513.

Alternative Scheduling Schemes

One alternative scheduling scheme (referred to as "Scheduling_Scheme_Three( )" and figure not shown) works on one input Feature Map (FM) and produces multiple Output FMs. This scheduling scheme exploits parallelism by working on multiple output FMs in parallel. Once the scheduling scheme starts working on an input FM, the partial output for all output FMs is generated.

The convolution and summing operations are combined and mapped to each available PU. This scheduling scheme makes use of the Shared input FM Data Register component 504 of the accelerator 501. The data for a single FM is loaded in this register and broadcast to all PUs. The kernel weights required to generate the output FMs are loaded into the on-chip Shared Memory (SM). Also, the partial output FMs are brought into the SM before performing any operations on a set of output FMs. The output FMs are stored back once again when each all output pixels in each output FM have been updated. Once the input FM is used for all output FMs, a new input FM is brought in SM. DMA operations are required to move the data between the on-chip shared memory and external memory. A loop analysis of this scheduling scheme reveals high data reuse of input FM data. Input FMs are only brought in the outer FM loop. However, a lower data reuse is seen for the output FM data. The process of loading the partial output FM data and storing it back is executed in the inner outFM loop. The data reuse of kernel weights remains unchanged in comparison with other scheduling schemes. However, there is a potential for better performance as all PUs are used for convolution operations. The do_conv_and_sum( ) operation is executed in parallel on PUs.

Another alternative scheduling scheme (referred to as "Scheduling_Scheme_Four( )" and figure not shown) is designed to reduce the on-chip SM size requirement and enables keeping the input and output FM data on-chip instead of accessing off-chip external memory. The scheduling scheme is designed for layers where input FMs are stored in on-chip SM. Unlike other scheduling schemes that process input/output FM in one go, this scheduling scheme processes the input FM in small portions or bands. A band sized data is enough to produce a single row of output FM. The goal is to reuse the on-chip input FM space to store the output FM. Once a certain set of input FM bands are processed, one row of data for each output FM is generated. Because certain portions of data from each input FM is not needed anymore, that space can be used to store the output FM row. Parallelism is exploited by processing multiple input FM bands in parallel. This scheme enables keeping the input and output data in an on-chip SM that is not big enough to keep both input FMs and output FMs at the same time. The other scheduling schemes require separate memory space to keep the input and output FMs. However, this scheduling scheme only works if the rate of generation of output FMs is less than or equal to the rate of consumption of input FMs. Only then is it possible to reuse the input SM space for storing output. The kernel weight function is encapsulated by three loops. Therefore, the number of external memory accesses for kernel weights is increased by a factor of the height of the output FM. This scheduling scheme only needs to read kernel weights from the external memory.

In order to find the best scheduling scheme for each layer of the CNN algorithm to reduce the overall design costs for execution of the CNN algorithm (such as SM size, external memory accesses and the execution time), performing simulations (either exhaustively or selectively) can be time consuming. The simulation time exponentially increases with the number of possible scheduling schemes and layers of the CNN algorithm, since the scheduling scheme applied in a "current" layer will affect the selection of the scheduling scheme that is feasible for a "next" layer. The aforementioned dependency exists primarily due to the distribution and placement of the data in the local memory (i.e., the SM 507) and the external memory 513.

The described LDBS method produces a score by estimating the design costs when selecting a scheduling scheme for a layer of the CNN algorithm, so that the selection of the "best set" of scheduling schemes (also referred to as the "configuration set" of scheduling schemes) for a given CNN algorithm can be rapidly performed. The score is primarily determined using the dependency between scheduling schemes and their mapping to neighbouring CNN algorithm layers. The score reveals the extent of benefits in using a particular scheduling scheme on a particular CNN algorithm layer, so that the best set of scheduling schemes can be efficiently determined. Additional properties can be attached to the score, such as opportunity score, to further improve the accuracy of the selection.

Figure 12A:
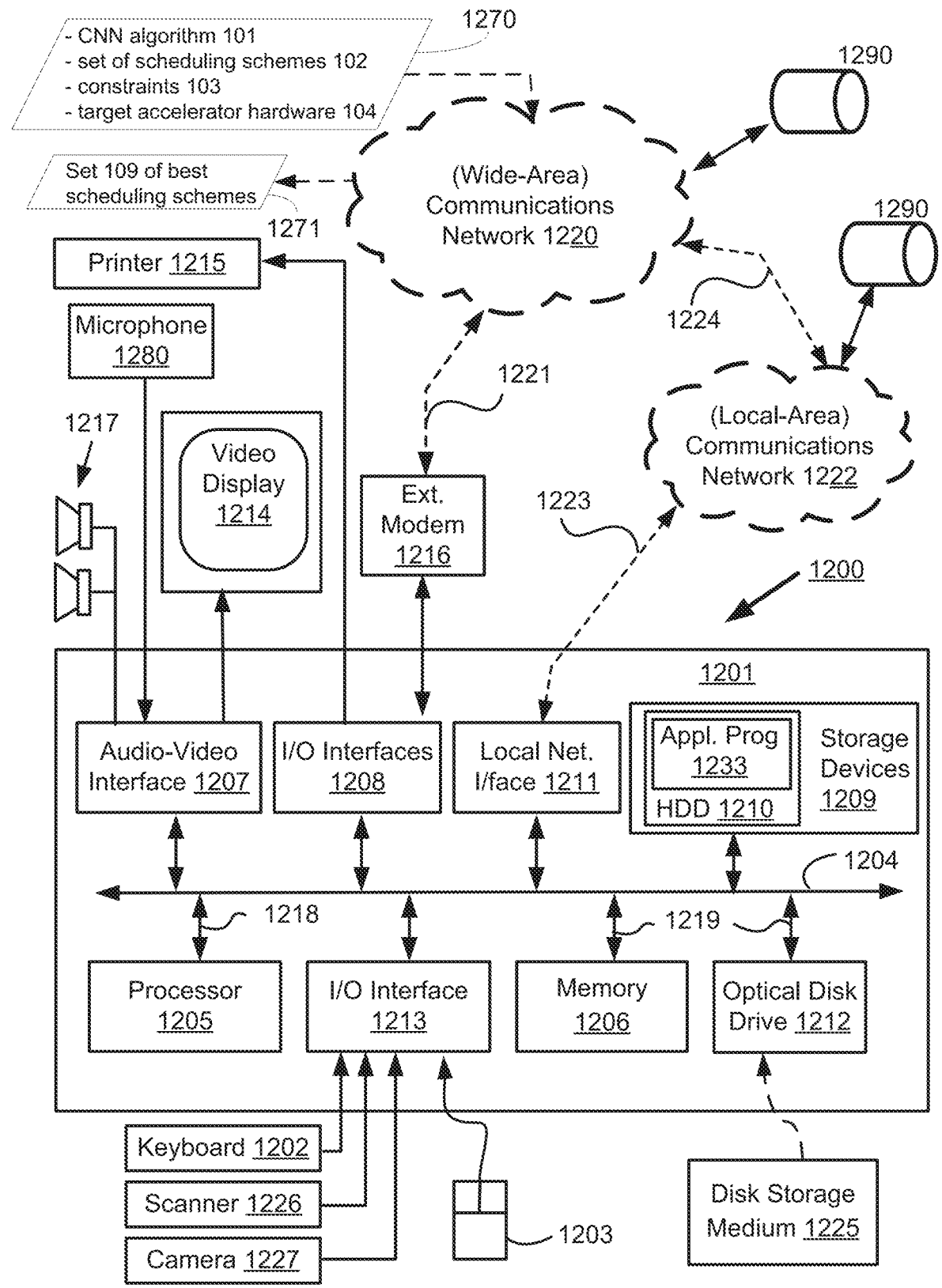
FIGS. 12A and 12B depict a general-purpose computer system 1200, upon which the various LDBS arrangements described can be practiced.
Figure 12B:
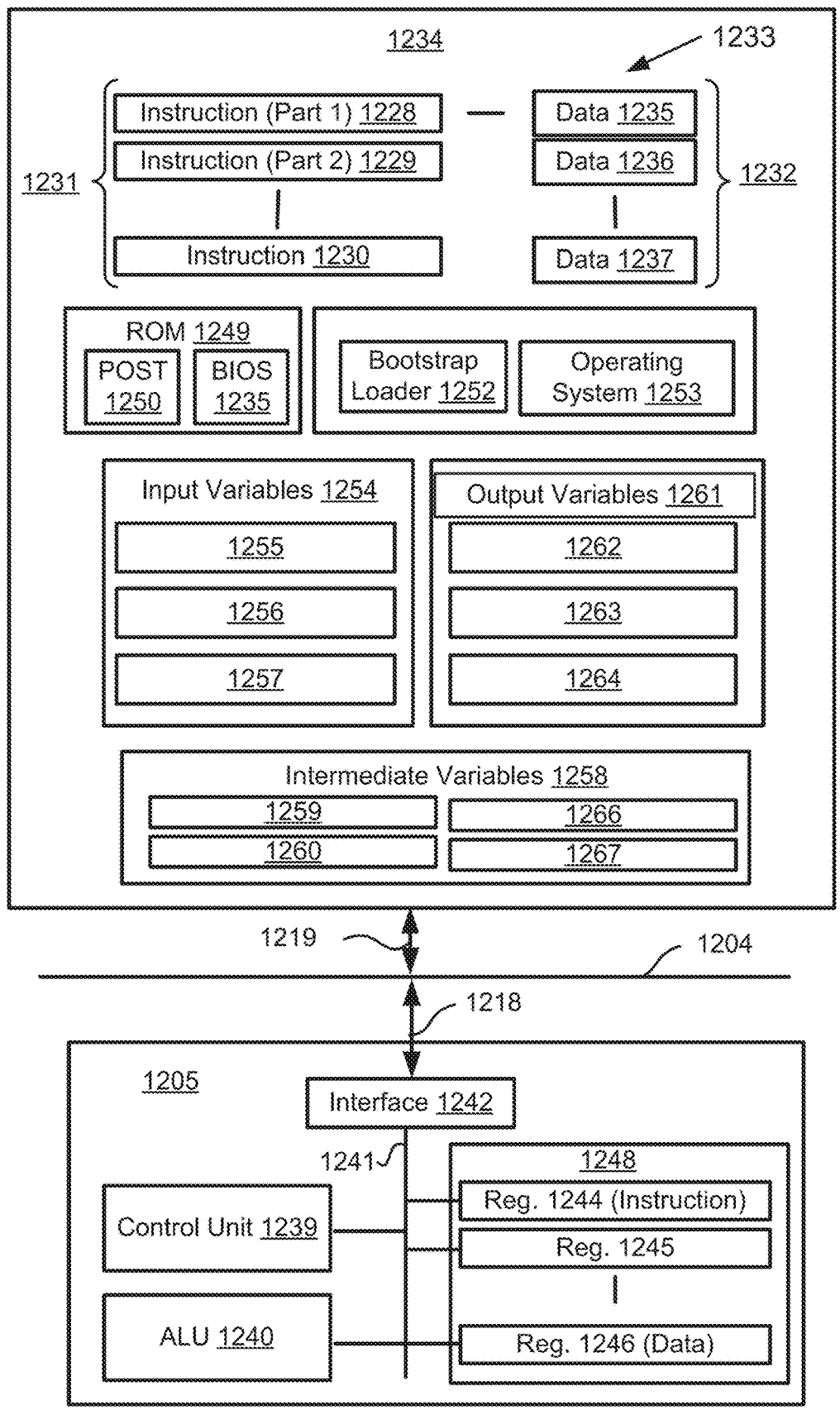

FIGS. 12A and 12B depict a general-purpose computer system 1200, upon which the various LDBS arrangements described can be practiced. More particularly, the computer system executes a LDBS software application 1233 in order to implement a process 105, described hereinafter in more detail with reference to FIG. 1. The aforementioned process 105 determines, from a set of input data 1270, the best set 1271 of scheduling schemes for executing the CNN algorithm 101 in question on the specified SoC. The step 105 thus configures the SoC by determining the best set 1271 of scheduling schemes for executing the CNN algorithm 101.

As seen in FIG. 12A, the computer system 1200 includes: a computer module 1201; input devices such as a keyboard 1202, a mouse pointer device 1203, a scanner 1226, a camera 1227, and a microphone 1280; and output devices including a printer 1215, a display device 1214 and loudspeakers 1217. An external Modulator-Demodulator (Modem) transceiver device 1216 may be used by the computer module 1201 for communicating to and from a communications network 1220 via a connection 1221. The communications network 1220 may be a wide-area network (WAN), such as the Internet, a cellular telecommunications network, or a private WAN. Where the connection 1221 is a telephone line, the modem 1216 may be a traditional "dial-up" modem. Alternatively, where the connection 1221 is a high capacity (e.g., cable) connection, the modem 1216 may be a broadband modem. A wireless modem may also be used for wireless connection to the communications network 1220.

The computer module 1201 typically includes at least one processor unit 1205, and a memory unit 1206. For example, the memory unit 1206 may have semiconductor random access memory (RAM) and semiconductor read only memory (ROM). The computer module 1201 also includes an number of input/output (I/O) interfaces including: an audio-video interface 1207 that couples to the video display 1214, loudspeakers 1217 and microphone 1280; an I/O interface 1213 that couples to the keyboard 1202, mouse 1203, scanner 1226, camera 1227 and optionally a joystick or other human interface device (not illustrated); and an interface 1208 for the external modem 1216 and printer 1215. In some implementations, the modem 1216 may be incorporated within the computer module 1201, for example within the interface 1208. The computer module 1201 also has a local network interface 1211, which permits coupling of the computer system 1200 via a connection 1223 to a local-area communications network 1222, known as a Local Area Network (LAN). As illustrated in FIG. 12A, the local communications network 1222 may also couple to the wide network 1220 via a connection 1224, which would typically include a so-called "firewall" device or device of similar functionality. The local network interface 1211 may comprise an Ethernet circuit card, a Bluetooth® wireless arrangement or an IEEE 802.11 wireless arrangement; however, numerous other types of interfaces may be practiced for the interface 1211.

The I/O interfaces 1208 and 1213 may afford either or both of serial and parallel connectivity, the former typically being implemented according to the Universal Serial Bus (USB) standards and having corresponding USB connectors (not illustrated). Storage devices 1209 are provided and typically include a hard disk drive (HDD) 1210. Other storage devices such as a floppy disk drive and a magnetic tape drive (not illustrated) may also be used. An optical disk drive 1212 is typically provided to act as a non-volatile source of data. Portable memory devices, such optical disks (e.g., CD-ROM, DVD, Blu ray Disc™), USB-RAM, portable, external hard drives, and floppy disks, for example, may be used as appropriate sources of data to the system 1200.

The components 1205 to 1213 of the computer module 1201 typically communicate via an interconnected bus 1204 and in a manner that results in a conventional mode of operation of the computer system 1200 known to those in the relevant art. For example, the processor 1205 is coupled to the system bus 1204 using a connection 1218. Likewise, the memory 1206 and optical disk drive 1212 are coupled to the system bus 1204 by connections 1219. Examples of computers on which the described arrangements can be practised include IBM-PC's and compatibles, Sun Sparcstations, Apple Mac™ or like computer systems.

The LDBS method may be implemented using the computer system 1200 wherein the processes of FIGS. 1-4, 7, 8, 11 and 13-17, to be described, may be implemented as one or more software application programs 1233 executable within the computer system 1200. In particular, the steps of the LDBS method are effected by instructions 1231 (see FIG. 12B) in the software 1233 that are carried out within the computer system 1200. The software instructions 1231 may be formed as one or more code modules, each for performing one or more particular tasks. The software may also be divided into two separate parts, in which a first part and the corresponding code modules performs the LDBS methods and a second part and the corresponding code modules manage a user interface between the first part and the user.

The software may be stored in a computer readable medium, including the storage devices described below, for example. The software is loaded into the computer system 1200 from the computer readable medium, and then executed by the computer system 1200. A computer readable medium having such software or computer program recorded on the computer readable medium is a computer program product. The use of the computer program product in the computer system 1200 preferably effects an advantageous LDBS apparatus.

The software 1233 is typically stored in the HDD 1210 or the memory 1206. The software is loaded into the computer system 1200 from a computer readable medium, and executed by the computer system 1200. Thus, for example, the software 1233 may be stored on an optically readable disk storage medium (e.g., CD-ROM) 1225 that is read by the optical disk drive 1212. A computer readable medium having such software or computer program recorded on it is a computer program product. The use of the computer program product in the computer system 1200 preferably effects a LDBS apparatus.

In some instances, the application programs 1233 may be supplied to the user encoded on one or more CD-ROMs 1225 and read via the corresponding drive 1212, or alternatively may be read by the user from the networks 1220 or 1222. Still further, the software can also be loaded into the computer system 1200 from other computer readable media. Computer readable storage media refers to any non-transitory tangible storage medium that provides recorded instructions and/or data to the computer system 1200 for execution and/or processing. Examples of such storage media include floppy disks, magnetic tape, CD-ROM, DVD, Blu-ray™ Disc, a hard disk drive, a ROM or integrated circuit, USB memory, a magneto-optical disk, or a computer readable card such as a PCMCIA card and the like, whether or not such devices are internal or external of the computer module 1201. Examples of transitory or non-tangible computer readable transmission media that may also participate in the provision of software, application programs, instructions and/or data to the computer module 1201 include radio or infra-red transmission channels as well as a network connection to another computer or networked device, and the Internet or Intranets including e-mail transmissions and information recorded on Websites and the like.

The second part of the application programs 1233 and the corresponding code modules mentioned above may be executed to implement one or more graphical user interfaces (GUIs) to be rendered or otherwise represented upon the display 1214. Through manipulation of typically the keyboard 1202 and the mouse 1203, a user of the computer system 1200 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 1217 and user voice commands input via the microphone 1280.

FIG. 1213 is a detailed schematic block diagram of the processor 1205 and a "memory" 1234. The memory 1234 represents a logical aggregation of all the memory modules (including the HDD 1209 and semiconductor memory 1206) that can be accessed by the computer module 1201 in FIG. 12A.

When the computer module 1201 is initially powered up, a power-on self-test (POST) program 1250 executes. The POST program 1250 is typically stored in a ROM 1249 of the semiconductor memory 1206 of FIG. 12A. A hardware device such as the ROM 1249 storing software is sometimes referred to as firmware. The POST program 1250 examines hardware within the computer module 1201 to ensure proper functioning and typically checks the processor 1205, the memory 1234 (1209, 1206), and a basic input-output systems software (BIOS) module 1235, also typically stored in the ROM 1249, for correct operation. Once the POST program 1250 has run successfully, the BIOS 1235 activates the hard disk drive 1210 of FIG. 12A. Activation of the hard disk drive 1210 causes a bootstrap loader program 1252 that is resident on the hard disk drive 1210 to execute via the processor 1205. This loads an operating system 1253 into the RAM memory 1206, upon which the operating system 1253 commences operation. The operating system 1253 is a system level application, executable by the processor 1205, to fulfil various high level functions, including processor management, memory management, device management, storage management, software application interface, and generic user interface.

The operating system 1253 manages the memory 1234 (1209, 1206) to ensure that each process or application running on the computer module 1201 has sufficient memory in which to execute without colliding with memory allocated to another process. Furthermore, the different types of memory available in the system 1200 of FIG. 12A must be used properly so that each process can run effectively. Accordingly, the aggregated memory 1234 is not intended to illustrate how particular segments of memory are allocated (unless otherwise stated), but rather to provide a general view of the memory accessible by the computer system 1200 and how such is used.

As shown in FIG. 12B, the processor 1205 includes a number of functional modules including a control unit 1239, an arithmetic logic unit (ALU) 1240, and a local or internal memory 1248, sometimes called a cache memory. The cache memory 1248 typically includes a number of storage registers 1244-1246 in a register section. One or more internal busses 1241 functionally interconnect these functional modules. The processor 1205 typically also has one or more interfaces 1242 for communicating with external devices via the system bus 1204, using a connection 1218. The memory 1234 is coupled to the bus 1204 using a connection 1219.

The application program 1233 includes a sequence of instructions 1231 that may include conditional branch and loop instructions. The program 1233 may also include data 1232 which is used in execution of the program 1233. The instructions 1231 and the data 1232 are stored in memory locations 1228, 1229, 1230 and 1235, 1236, 1237, respectively. Depending upon the relative size of the instructions 1231 and the memory locations 1228-1230, a particular instruction may be stored in a single memory location as depicted by the instruction shown in the memory location 1230. Alternately, an instruction may be segmented into a number of parts each of which is stored in a separate memory location, as depicted by the instruction segments shown in the memory locations 1228 and 1229.

In general, the processor 1205 is given a set of instructions which are executed therein. The processor 1205 waits for a subsequent input, to which the processor 1205 reacts to by executing another set of instructions. Each input may be provided from one or more of a number of sources, including data generated by one or more of the input devices 1202, 1203, data received from an external source across one of the networks 1220, 1202, data retrieved from one of the storage devices 1206, 1209 or data retrieved from a storage medium 1225 inserted into the corresponding reader 1212, all depicted in FIG. 12A. The execution of a set of the instructions may in some cases result in output of data. Execution may also involve storing data or variables to the memory 1234.

The disclosed LDBS arrangements use input variables 1254, which are stored in the memory 1234 in corresponding memory locations 1255, 1256, 1257. The LDBS arrangements produce output variables 1261, which are stored in the memory 1234 in corresponding memory locations 1262, 1263, 1264. Intermediate variables 1258 may be stored in memory locations 1259, 1260, 1266 and 1267.

Referring to the processor 1205 of FIG. 12B, the registers 1244, 1245, 1246, the arithmetic logic unit (ALU) 1240, and the control unit 1239 work together to perform sequences of micro-operations needed to perform "fetch, decode, and execute" cycles for every instruction in the instruction set making up the program 1233. Each fetch, decode, and execute cycle comprises:

a fetch operation, which fetches or reads an instruction 1231 from a memory location 1228, 1229, 1230;

a decode operation in which the control unit 1239 determines which instruction has been fetched; and an execute operation in which the control unit 1239 and/or the ALU 1240 execute the instruction.

Thereafter, a further fetch, decode, and execute cycle for the next instruction may be executed. Similarly, a store cycle may be performed by which the control unit 1239 stores or writes a value to a memory location 1232.

Each step or sub-process in the processes of FIGS. 1-4, 7, 8, 11 and 13-17 is associated with one or more segments of the program 1233 and is performed by the register section 1244, 1245, 1247, the ALU 1240, and the control unit 1239 in the processor 1205 working together to perform the fetch, decode, and execute cycles for every instruction in the instruction set for the noted segments of the program 1233.

The LDBS method may alternatively be implemented in dedicated hardware such as one or more integrated circuits performing the LDBS functions or sub functions. Such dedicated hardware may include graphic processors, digital signal processors, or one or more microprocessors and associated memories.

LDBS Arrangement 1

FIG. 1 is an overview flowchart of a method 100 for implementing a preferred LDBS arrangement. The method 100 receives input information describing (a) the CNN algorithm to be executed, (b) a set of scheduling schemes, (c) a set of constraints, and (d) a description of the target accelerator hardware (eg see 501 in FIG. 5). In one LDBS arrangement the method 100 outputs a "best" set 109 of scheduling schemes (also referred to as the "configuration set" of scheduling schemes). In another LDBS arrangements the method 100 programs the controller 503 (see FIG. 5) with the aforementioned set 109 of best scheduling schemes, in order to execute the CNN algorithm in question.

A step 105, performed by the processor 1205 as directed by the LDBS software 1233, configures the SoC by determining a best scheduling scheme 108 per layer of the CNN algorithm in question dependent upon receiving the CNN algorithm 101, the available set of scheduling schemes 102, the set of constraints 103 and the target accelerator hardware configuration 104. The CNN algorithm 101 is a full description of the CNN algorithm, including the number of CNN layers, the number of FMs in each layer and the layer sizes, functionalities of each layer (i,e., convolution, pooling, classifier), kernel size, stride size, etc. The set of available scheduling schemes 102 is provided by the designer. Examples of scheduling schemes are provided in FIGS. 7 and 8.

The constraints 102 may be limits on the total size of the local memory including memory elements 1720, 1710, in SoC 1714 or 507 in SoC 501, this being referred to as an "SRAM size constraint", a pre-defined maximum number of permitted accesses to external memory 1709, 513, this being referred to as a "DRAM access constraint", predefined minimum throughput, which is related to the execution time and the like. Such constraints are decided based on the target hardware architecture 104. The target accelerator hardware 104 is a multi-accelerator based architecture with multiple processing units (PUs), as shown in the example in FIG. 5

Once a best set 109 of scheduling schemes for the layers of the CNN algorithm is determined in the step 105, thereby configuring the SoC, the controller 503 in the hardware architecture 500 may be programmed in a step 106 with the best set 109 of scheduling schemes thereby implementing the CNN algorithm on the SoC. The CNN algorithm can then be executed in the hardware architecture 500 in a step 107, due to the controller 503 assigning the PUs 505, 506, 510, 511 with operations from the selected scheduling schemes 109.

Figure 2:
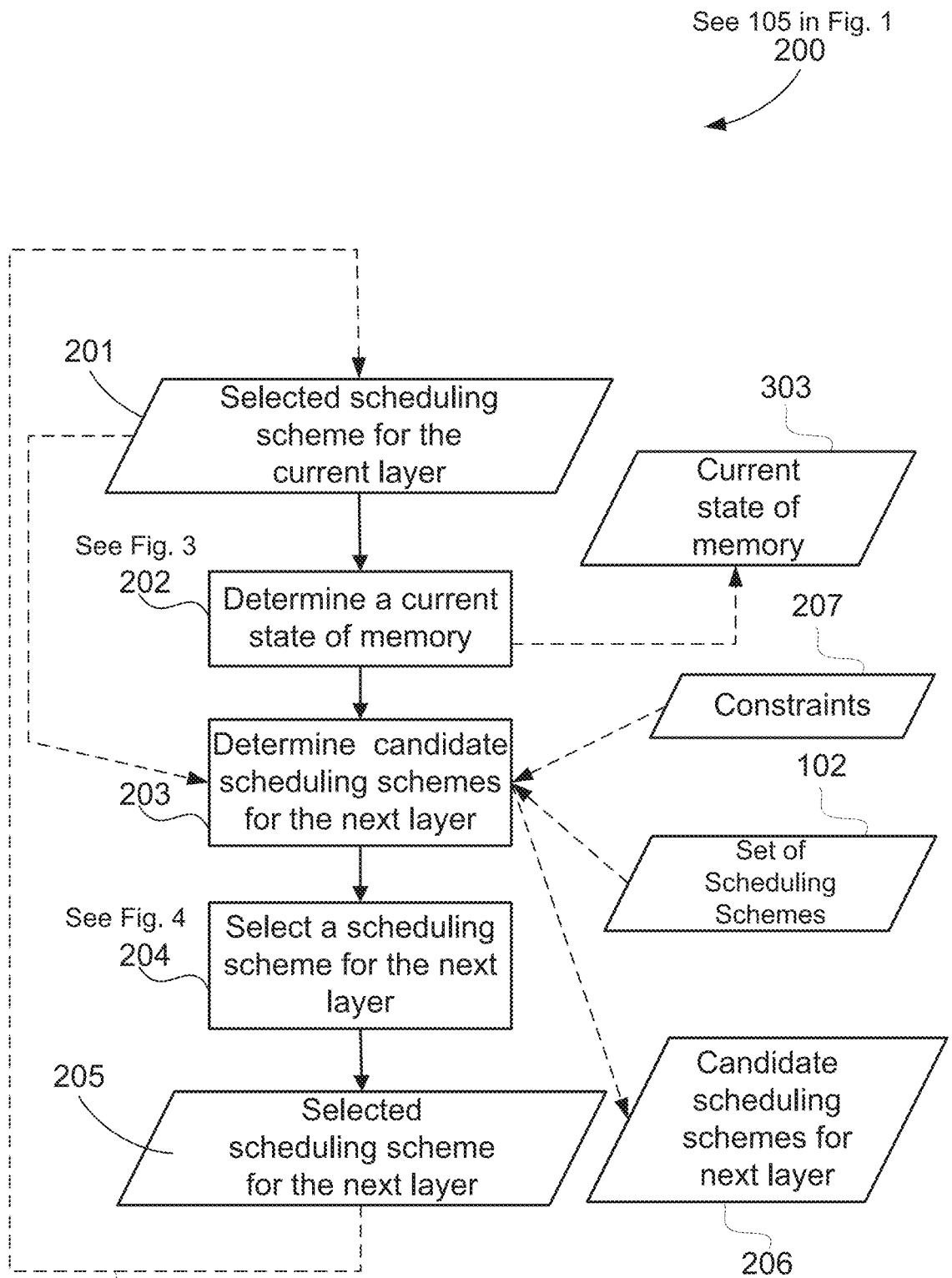
FIG. 2 is a schematic flow diagram illustrating a method to select the scheduling scheme for the next layer by analysing the current layer.

FIG. 2 is a flowchart for an example of a method 200 for implementing the step 105 of the method 100 in FIG. 1 for a current layer. The step 105 is concerned with determining scheduling schemes for the layers of the CNN algorithm. In a preferred LDBS implementation, the best scheduling scheme for each layer of the CNN application is selected commencing from the left most layer 1704 (also referred to as the first layer) and proceeding to the right most layer 1706. Since the CNN algorithm considers neighbouring layers 1704, 1705 or 1705, 1706 during an execution, a "current" layer and a "next" layer (ie a layer next to the current layer are considered during the selection of the best scheduling scheme in the method 200.

Initially a selected scheduling scheme 201 for the current layer is provided. If the current layer is the first layer, then 201 may be selected from the set of scheduling schemes 102 by, for example, (i) determining an opportunity score D for each of the scheduling schemes in the set 102 of scheduling schemes, and (ii) selecting the scheduling scheme 201 as the scheduling scheme with the best opportunity score. Alternately, the process described in relation to FIG. 11 can be used to determine the best scheduling scheme 1113 for the first layer. If the current layer is not the first layer, then 201 is selected by a step 204 (described hereinafter in more detail).

A step 202, performed by the processor 1205 as directed by the LDBS software 1233 in relation to a current layer, determines a "current state of memory" 303, described hereinafter in more detail with reference to FIG. 3, dependent upon the received selected scheduling scheme 201 for the current layer. In a preferred LDBS arrangement, the current state of memory 303 is the available local memory space So,l (described hereinafter in more detail with reference to Equation 1) available for execution of the current layer.

A following step 203, performed by the processor 1205 as directed by the LDBS software 1233, determines candidate scheduling schemes 206 for the next layer dependent upon the selected scheduling scheme 201 of the current layer, constraints 207 (such as local memory constraint or SRAM constraint). The set 206 of candidate scheduling schemes may be a subset of the originally provided set 102 of scheduling schemes. Based on the current state of memory 303 determined in the step 202 and the candidate scheduling schemes 206 determined in the step 203, a following step 204, described hereinafter in more detail with reference to FIG. 4 and performed by the processor 1205 as directed by the LDBS software 1233, selects a best scheduling scheme 205 for the next layer.

The selected scheduling scheme 205 for the next layer is passed as the input (ie replacing 201), as depicted by a dashed line 208, and the method 200 is implemented for identifying a best scheduling scheme for the following layer.

Figure 3:
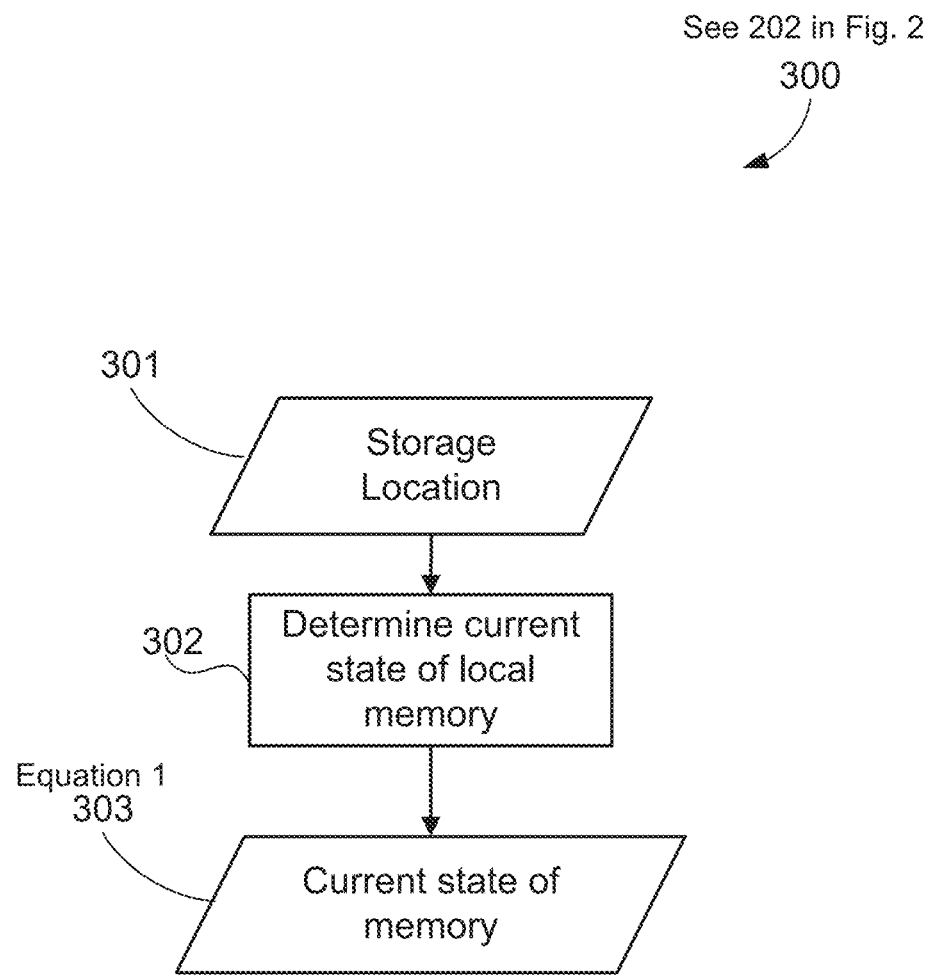
FIG. 3 is a schematic diagram illustrating a method to determine the current state of memory.

FIG. 3 is a flowchart for an example of a method 300 for implementing the step 202 of the method 200 in FIG. 2. The step 202 is concerned with determining a current state of memory. Information defining the size Lconst of a local storage location 301 (such as the memory module 1710 in FIG. 17 or a memory region in the SM 507 that has been allocated to the SoC layer in question in the SoC when the SoC was fabricated) is input to a step 302. The step 302, performed by the processor 1205 as directed by the LDBS software 1233, determines a "current state of memory" 303.

In one LDBS arrangement the current state of memory 303 is the "available local memory space" So,l which, as described hereinafter in more detail with reference to Equation 1, is dependent upon the size of the storage location 301 (ie Lconst) and the amount of memory Si,l required for executing the current SoC layer as specified by the selected scheduling scheme 201. The relative sizes of So,l and Si,l affect the latencies and execution of the CNN algorithm differently. The available local memory space So,l for executing the current CNN algorithm layer with the selecting scheduling scheme can be determined as shown in Equation 1, for a preferred LDBS implementation.

$$So,l = Lconst - Si,l \qquad 1$$

where: So,l is the available local memory space available for executing the current CNN algorithm layer; Lconst is a constraint on the local memory provided by the designer; and Si,l is the local memory space required to process the current layer with the selected scheduling scheme.

For example, let us assume that the Lconst is 620 kilo Bytes (KB) and the input FM size is 227×227×4 Bytes (width*height*size of pixel), and there are three PUs (eg 1711, 1712 and 1713) in the SoC. If the selected scheduling scheme is "Scheduling_Scheme_One( )" in 701, the required input local size Si,l is 227×227×4×3/1000 kB=618 kB. This is because the local memory space Si,l required to process the current layer with the selected scheduling scheme needs to hold data associated with the FM size ie 227×227×4 Bytes and needs to do this for all three PUs. This is because the data have to be loaded to the local memory for all the assigned PUs before executing in "Scheduling_Scheme_One( )" in 701. Hence the available local memory space So,l available for executing the current CNN algorithm layer is 620−618=2 kB as per Equation 1.

As noted above, in one LDBS implementation the current state of memory is given by So,l which is the available local memory space available for executing the current CNN algorithm layer. In alternative LDBS arrangements the current state of memory can be a combination of the So,l and the available space in the external memory 513, 1709, or only the space available in the external memory, or a ratio of the So,l and the space available in the external memory.

Figure 4:
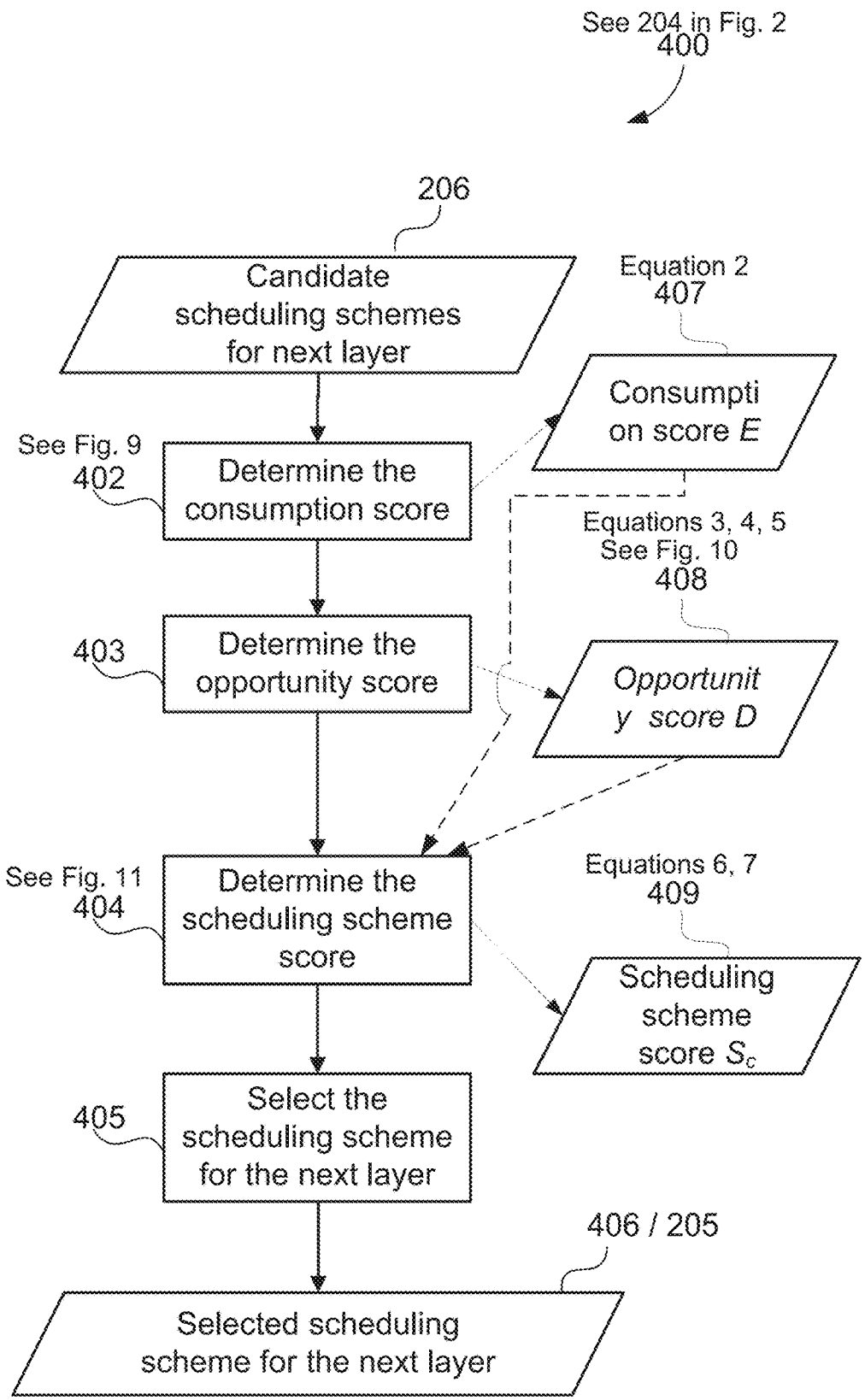
FIG. 4 is a schematic flow diagram illustrating a method to combine costs to select the scheduling scheme for the next layer.
Figure 9:
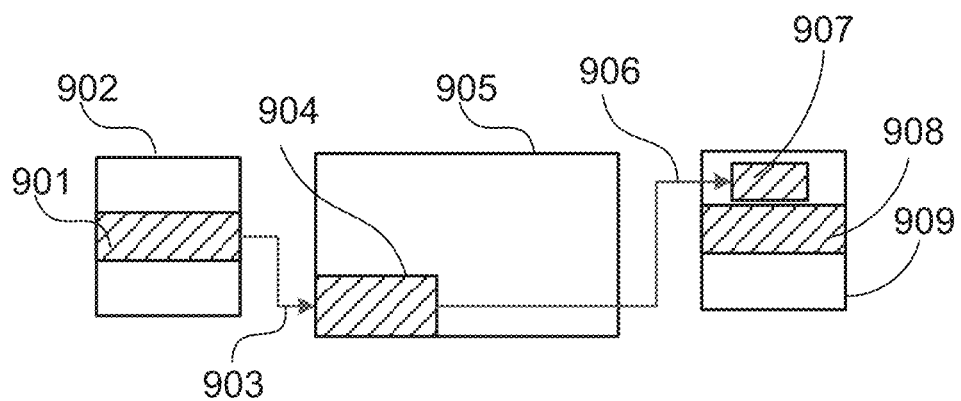
FIG. 9 is an example showing the memory components to compute the computation score in FIG. 4.

FIG. 4 illustrates a flow chart for one example of a method 400 for implementing the step 204 of the method 200. The step 204 is concerned with selecting a scheduling scheme for the next layer. A set 206 of candidate scheduling schemes for a next layer are received. A consumption score E (ie 407), described hereinafter in more detail with reference to FIG. 9, is determined in a step 402, performed by the processor 1205 as directed by the LDBS software 1233, for the given candidate scheduling schemes 401, by applying Equation 2 for a preferred LDBS implementation.

$$\text{Consumption Score of a scheduling scheme, } E = So,l/Si \qquad 2$$

where: E is a ratio between So,l (formulated in Equation 1 is the available local memory space available for output to execute the current layer) and Si, the amount of input data required to start the execution of the scheduling scheme for the next layer. A distinct consumption score E is determined for each of the scheduling schemes 206. E is the consumption of the considered scheduling scheme, which is a quantitative measure to indicate the data availability in which the execution can start. So,l is the available local memory space for execution of the current layer. Si is the amount of data required in to start executing the scheduling scheme.

Continuing the previous example, if the next layer has a feature map size of 55×55 (width*height), the Si=55×55×

3×4 Bytes, where there are three PUs in the architecture as mentioned above. Hence the value of E is 2 kB/(55×55×3×4)Bytes=0.055, if we apply Equation 2, noting that all three PUs require data to be available in the memory before starting the execution of the scheduling scheme. The calculated value of So,l is 2 kB as previously explained, hence a ratio between the So,l of 2 kB and Si of (55×55×3×4)Bytes will provide the value of E which is 0.055 as per Equation 2.

The consumption score E (ie 407) reflects the effectiveness of the execution of the layer of the CNN algorithm in the SoC, and has a value E>1 if the required input data is already available in the local memory. If E<1, then additional input data has to be fetched from the external memory to the local memory before execution.

FIG. 9 provides an illustrative example 900 of components involved in determining the consumption score E (ie 407) in Equation 2. When output data is produced via a scheduling scheme, an associated local memory 902 (ie a pre-allocated region in SM 507 or the local memory 1720) is utilised first. Once allocated output space 901 (ie Lconst) is not sufficient to store all the data, the remaining output data 904 is stored in an external memory 905 (ie 513).

When a scheduling scheme executes the next layer, an associated local memory 909 is analysed to see whether the input data required to start the execution of the scheduling scheme for the next layer (i.e., Si) is available to immediately start the execution. If the data is not available, then the remaining input data has to be fetched from the external memory 905 using the DMA module 508 as shown in FIG. 5. 908 is the amount of data available in the local memory which is required to execute the next layer. If Si, the minimum amount of data required to start the execution of the scheduling scheme, is less than the data in 908 the scheduling scheme can start immediately. If Si is greater than the data in 908, the remaining data 907 (i.e., Si—size of 908) is retrieved from the external memory 905.

For an accelerator, utilising the local memory has shorter latency while accessing the external memory has a significantly larger latency. Hence the more data to he fetched from the external memory, the more execution time is required for the completion of the layer processing.

Figure 10:
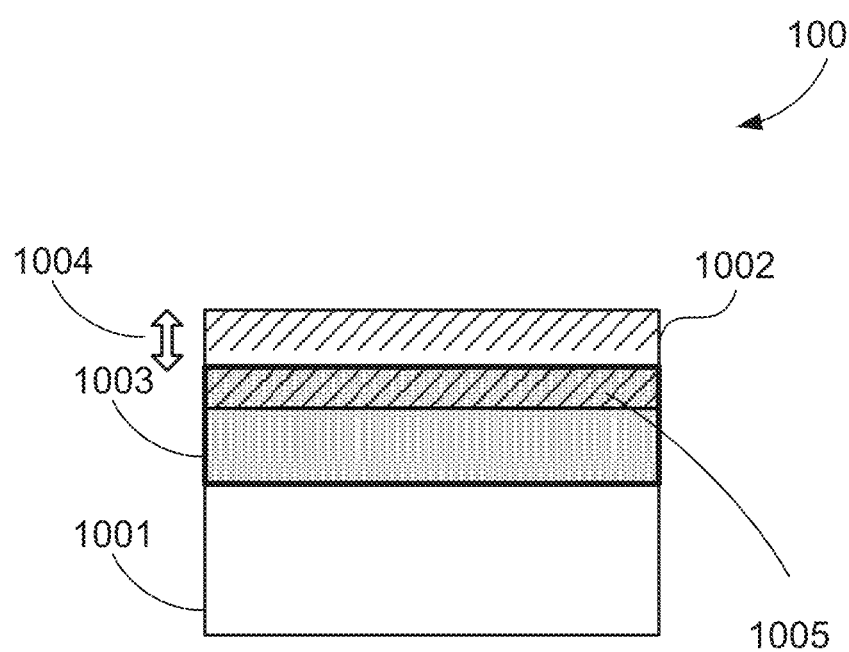
FIG. 10 is an example showing the banding approach to compute the opportunity score in FIG. 4.

Returning to FIG. 4, once the step 402 determines the consumption score E for each of the scheduling schemes 206, in a preferred LDBS implementation a following step 403, performed by the processor 1205 as directed by the LDBS software 1233, determines an opportunity score D (ie 408) for the received candidate scheduling schemes 401. The opportunity score D, described hereinafter in more detail with reference to FIG. 10, is defined according to Equation 3:

$$\text{Opportunity Score of a scheduling scheme, } D = D_s/D_b \quad (3)$$

where: Ds is an estimated opportunity score of the particular scheduling scheme in question, and Db is the best estimated opportunity score Db across all the candidate scheduling schemes 401. Equation 3 computes the ratio between Ds and Db, to quantify the benefits in using the considered scheduling scheme compared to the scheduling scheme which has the best opportunity cost.

As shown in Equation 3 the opportunity score D of a particular scheduling scheme is formulated as a ratio between the estimated opportunity score Ds of the particular scheduling scheme and the best estimated opportunity score Db across all the candidate scheduling schemes 401. In a preferred LDBS implementation the opportunity score D is the amount of data reused in local memory. In alternative LDBS implementations, the opportunity score D can be the PU utilisation or the number of external memory accesses or any other properties related to the hardware architecture which can be exploited to reduce the design costs.

FIG. 10 provides an illustrative example 1000 of the components involved in determining the opportunity score D in Equation 3. During the execution of the CNN algorithm, each feature map (such as 1001) is typically processed in rows (such as 1002 and 1003), where row is a portion of the feature map with the same width as the feature map but a much smaller height (but larger than the kernel size so that at least a kernel can be processed). In one example a row 1002 is processed first, and then using a stride size of 1004, a shifted row 1003 is processed. If the row 1002 is residing in a local memory 1001 and a row 1003 has to be fetched from the external memory, an overlapping region 1005 between the rows 1004 and 1003 can be reused from the local memory without needing access to external memory. This reusable aspect is referred to as an opportunity.

As previously described in regard to FIG. 7, the "Scheduling_Scheme_One( )" in 701 loads the entire feature map into local memory, and hence can fully utilise the reuse opportunity described in regard to FIG. 10. However the "Scheduling_Scheme_Two( )" in 801 loads bands or rows at a time and the loaded bands are overwritten by the bands from other feature maps. Hence the "Scheduling_Scheme_Two( )" in 801 loses the opportunity to reuse the data.

In a preferred LDBS implementation, the opportunity score D is measured in terms of the total external memory accesses, as characterised in Equation 4:

$$\text{input FM accesses, } A_i = \text{in\_x} * \text{in\_y} * \text{inFM} * \text{outFM output FM accesses, } A_o = \text{out\_x} * \text{out\_y} * \text{outFM kernel weight accesses,}$$
$$A_k = \text{k\_size} * \text{k\_size} * \text{inFM} * \text{outFM total memory accesses, } A_{S1} = A_i + A_o + A_k \quad (4)$$

where: in_x, in_y, out_x and out_y are respective widths and heights of the input feature map and output feature map as shown in FIG. 6; inFM and outFM are the number of input feature maps processed and the number of output feature maps produced respectively; The total memory accesses is contributed by the input FM accesses (ie. $A_i$ as shown in Equation 4) to read the FM data from external memory, output FM accesses (ie. $A_o$ as shown in Equation 4) to store the output FM data to the external memory and the kernel weight accesses (ie. $A_k$ as shown in Equation 4) to read the kernel weights from the external memory in order to perform convolutions with the FMs. The input FM access, $A_i$, is computed using the height, in_y (such as 604), and width, in_x (such as 605), of the input feature maps, as shown in FIG. 6, and the number of input feature maps, inFM, and the number of output feature maps produced, outFM. The output FM access, $A_o$, is computed using the height, out_y (such as 615), and width, out_x (such as 611), of the output FM, as shown in FIG. 6, and the number of output FMs, outFM. The kernel weight access, $A_k$, is computed using the kernel size, with the kernel height, k_size (such as 620), and kernel width, k_size (such as 621), and the number of input FMs, inFM, and the number of output FMs, outFM. The total memory accesses $A_{S1}$ for "Scheduling_Scheme_One( )" in 701 is the addition of memory accesses for input feature maps $A_i$ output feature maps $A_o$ and kernel weights $A_k$ respectively.

Equation 4 depicts a set of calculations to determine the total memory accesses of the "Scheduling_Scheme_One( )"

in 701, where a feature map is loaded into local memory in its entirety, rather than loading several rows of the feature map at a time.

Similarly, Equation 5 depicts the opportunity score D, measured in terms of memory accesses for "Scheduling_ Scheme_Two( )" in 801, where the data is processed in rows. Since the processed rows are evicted from the local memory to replace the newer rows for processing, there is less data reuse. In this case, such a lack of data reuse will incur additional external memory accesses, which is characterised as opportunity $A_p$ in Equation 5:

$$\text{Opportunity, } A_p = \text{inFM} * \text{outFM} * (\text{out\_x} * (\text{k\_size} - \text{stride\_size}) * \text{out\_y}) \text{ total memory accesses}$$
$$A_{S2} = A_{S1} + A_p + O \quad (5)$$

where: $A_p$ refers to the memory region in 1005; the O component refers to the reordering cost if the data has to be reordered before processing; inFM is the number of input feature maps and outFM is the number of output feature maps; out_x is the width of the output FM (such as 611) and out_y is the height of the output FM (such as 615) as shown in FIG. 6.; k_size is the height of the kernel (such as 620) and stride_size is the height of the stride (such as 1004). The $A_p$ formulates the region, 1005, which is not being reused when using "Scheduling_Scheme_Two( )" in 801, feature maps are processed as partial rows. The total memory accesses, $A_{S2}$, for the "Scheduling_Scheme_Two( )" in 801 is formulated as a sum of the total memory accesses required for "Scheduling_Scheme_One( )" in 701, $A_{S1}$, the opportunity $A_p$, and O. The O component refers to the reordering cost if the data has to be reordered before processing.

For example, if the convolution is performed in a non-sequential fashion, then the pooling operation requires that the data be reordered before processing. In such a scenario, additional external memory accesses will incur due to reordering. In this example of using the two scheduling schemes, $Ds = A_{S1}$, and $Db = A_{S2}$. Based on the above numerical example, if there are three PUs and 96 output feature maps produced with a size of 55×55, and k_size=11, stride_size=4, the opportunity accesses=3*96*(55*(11-4)*55)=6,098,400.

Once the step 403 determines the opportunity score D, a following step 404, performed by the processor 1205 as directed by the LDBS software 1233, and described hereinafter in more detail with reference to FIG. 11, determines a scheduling scheme score $S_C$ (ie 409) for all the candidate scheduling schemes 401 considered for the next layer, using Equation 6 for a preferred LDBS implementation:

$$\text{Scheduling Scheme Score, } S_C = E \quad 6$$

where: E refers to the consumption score as shown in Equation 2; the scheduling scheme score $S_C$ is quantified as the consumption score.

An alternative formulation scheduling scheme score $S_C$ combines the consumption score E (ie 407) and the opportunity score D (ie 408) as shown in Equation 7;

$$\text{Scheduling Scheme Score, } S_C = \alpha.E/\beta.D \quad 7$$

where: α and β are constants which are decided at design time. The proportion between the consumption score, E, and the opportunity score, D, can be adjusted using α and β, based upon the technology used in the SoC, such as memory technology.

A following step 405, performed by the processor 1205 as directed by the LDBS software 1233, selects a best scheduling scheme 205 from the candidate schemes 206 based on the scheduling scheme scores 409. In a preferred LDBS implementation, the scheduling scheme which has the largest scheduling score $S_C$ is selected as the best scheduling scheme 406 for the next layer. The selected scheduling scheme 406 for the next layer is then used to select the scheduling scheme for the following layer.

Figure 11:
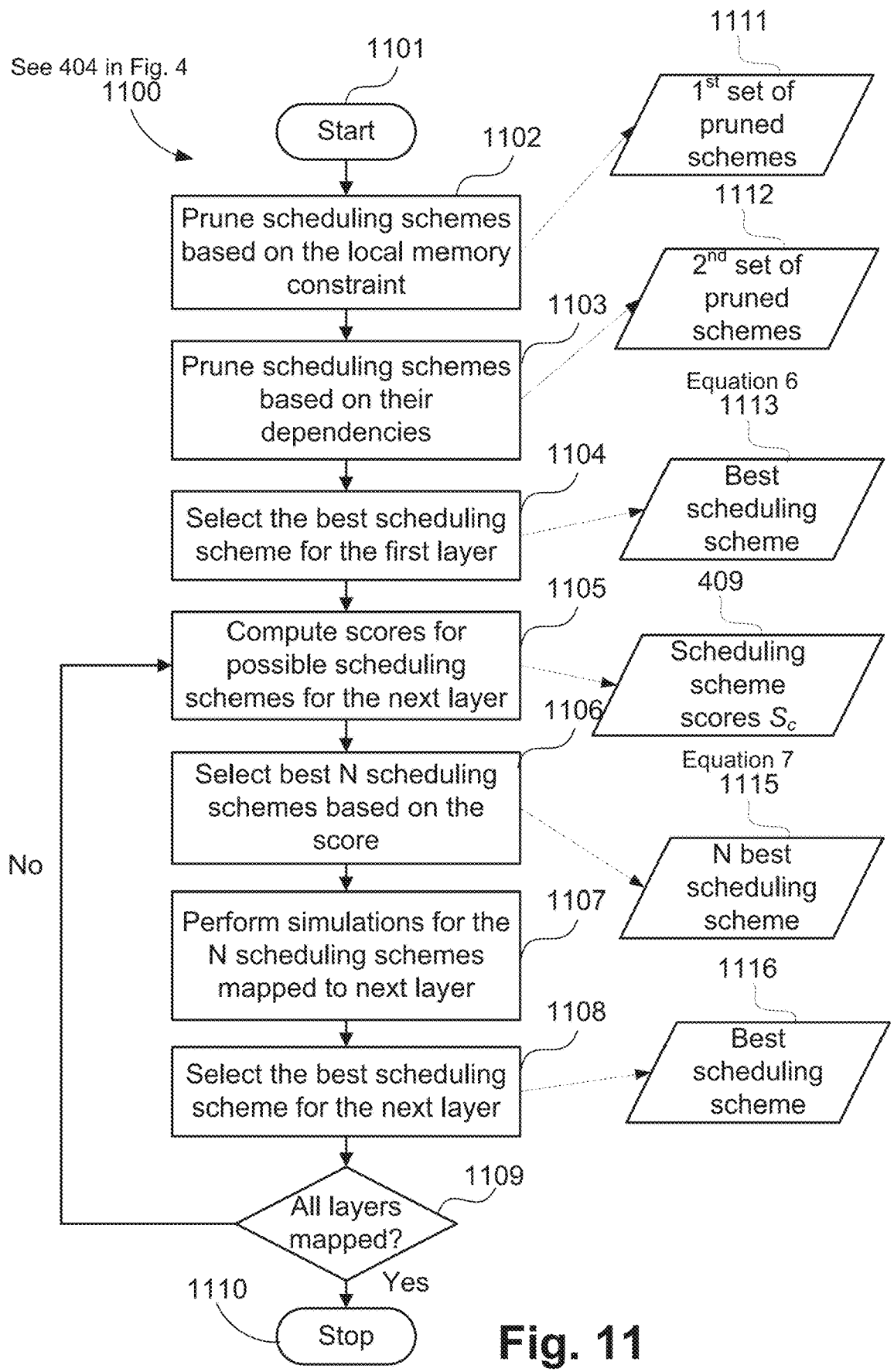
FIG. 11 is a schematic flow diagram illustrating a detailed method for 105 to determine the scheduling schemes for the layers of the CNN algorithm.

FIG. 11 is a flow chart for an example of a preferred method 1100, performed by the processor 1205 as directed by the LDBS software 1233, for selecting the best set 109 of scheduling schemes for all the layers of the CNN algorithm. After pruning in steps 1102 and 1103, the scheduling schemes are selected for the first layer and the remaining layers of the CNN application by determining the scheduling scheme score in 404 for the candidate scheduling schemes 401. The selection of the best scheduling scheme for the first layer in 1104 uses the determined consumption score in 403 as formulated in Equation 2. Scheduling schemes are optimally selected for each layer of the CNN algorithm in order to find the best selection of scheduling schemes for the entire CNN algorithm. The method 1100 starts at a step 1101 and a following step 1102, performed by the processor 1205 as directed by the LDBS software 1233, prunes the candidate scheduling schemes 206 for the next layer which do not adhere to the local memory constraint (e.g., SRAM constraint) to produce a first set 1111 of pruned scheduling schemes. For example, the "Scheduling_Scheme_One( )" in 701 requires at least three input feature map sizes for three PUs. Hence if the local memory constraint is below that value, then that scheduling scheme becomes inapplicable and is pruned by the step 1102.

In a following step 1103, performed by the processor 1205 as directed by the LDBS software 1233, a further pruning operation is applied to the first set 1111 of pruned scheduling schemes based on dependencies between the scheduling schemes to form a $2^{nd}$ set 1112 of pruned scheduling schemes. For example, if one scheduling scheme stores all the results to the external memory and another scheduling scheme reads the input from the local memory, these two scheduling schemes (ie this pair of scheduling schemes) have incompatible memory access operations and thus cannot be assigned to neighbouring layers. For example, if the selected scheduling scheme for the current layer stores the entire output data to external memory, the scheduling scheme which always reads the input data from the local memory is pruned by the step 1103.

Once scheduling schemes are pruned in the steps 1102, 1103, a following step 1104, performed by the processor 1205 as directed by the LDBS software 1233, chooses, for the first layer of the CNN algorithm, the best scheduling scheme 1113 from the $2^{nd}$ set 1112 of pruned schemes based upon scheduling scheme scores $S_C$ by applying Equation 6.

A following step 1105, performed by the processor 1205 as directed by the LDBS software 1233, determines the scheduling scheme scores $S_C$ (ie 409) for the second layer by considering the possible scheduling schemes for the second layer, where the possible scheduling schemes are the $2^{nd}$ set 1112 of pruned schemes. A following step 1106, performed by the processor 1205 as directed by the LDBS software 1233, selects the N number of best scheduling schemes (1115) for the second layer, based on the scheduling scheme scores $S_C$ (ie 409), determined using Equation 7.

A following step 1107, performed by the processor 1205 as directed by the LDBS software 1233, performs simulations, at a level of abstraction and environment preferred by the designer, for the N number of scheduling schemes 1115 for the second layer. A following step 1108 selects the best scheduling scheme 1116 for the next layer with respect to design costs, which are accurately evaluated after simulations.

A following decision step 1109, performed by the processor 1205 as directed by the LDBS software 1233, determines if not all the layers have been mapped, and if not then the method 1100 follows a NO arrow and the steps 1105-1108 are iterated until all the layers have a selected scheduling scheme. The method 1100 then terminates at a step 1110 when the selection reaches the last layer of the CNN algorithm during the check in 1109.

Extended Cost Estimations

The following are specific example formulations to estimate the memory size and execution time for different scheduling schemes, depending upon the location of the data.

The minimum on-chip shared memory size required depends on the scheduling scheme and whether input/output data is stored in on-chip memory or external memory. In case the data is in external memory, a double buffering scheme is used to overlap computation and communication. Otherwise, the on-chip memory should be large enough to store all input and/or output FMs. The on-chip memory sizes for each scheduling scheme are estimated by using following equations:

The total on-chip memory size is equal to the sum of space required for input FM (ie., input FM space), out FM (ie., output FM space) and weights (Weight space).

Scheduling Scheme One

If the input FMs are stored in on chip shared memory:

$$\text{input FM space}=in\_x*in\_y\ inFM$$

Otherwise if input FMs are stored in off chip external memory:

$$\text{input FM space}=in\_x*in\_y*numPU*2$$

If output FMs are stored in on-chip shared memory:

$$\text{output FM space}=out\_x*out\_y*outFM$$

Otherwise if output FMs are stored off chip external memory:

$$\text{output FM space}=out\_x*out\_y*3$$

For kernel weights:

$$\text{Weight space}=k\_size*k\_size*numPU*2$$

Scheduling Scheme Two

If the input FMs are stored in on chip shared memory:

$$\text{input FM space}=in\_x*in\_y*inFM$$

Otherwise if input FMs are stored in off chip external memory:

$$\text{input FM space}=in\_x*(k\_size+stride\_size)*numPU$$

where k_size is the kernel size and numPUs are the number of PUs available for execution in the accelerator.

If output FMs are stored in on-chip shared memory:

$$\text{output FM space}=out\_x*out\_y*outFM$$

Otherwise if output FMs are stored off chip external memory:

$$\text{output FM space}=out\_x*out\_y*2$$

For kernel weights:

$$\text{Weight space}=k\_size*k\_size*numPU*2$$

Scheduling Scheme Three

If the input FMs are stored in on chip shared memory:

$$\text{input FM space}=in\_x*in\_y*inFM$$

Otherwise if input FMs are stored in off chip external memory:

$$\text{input FM space}=in\_x*in\_y*2$$

If output FMs are stored in on-chip shared memory:

$$\text{output FM space}=out\_x*out\_y*outFM$$

Otherwise if output FMs are stored off chip external memory:

$$\text{output FM space}=out\_x*out\_y*3*numPU$$

For kernel weights:

$$\text{Weight space}=k\_size*k\_size*numPU*2$$

Scheduling Scheme Four

Input and output FMs are always stored in on chip shared memory:

$$\text{input FM space}=in\_x*in\_y*inFM+out\_y*outFM$$

For kernel weights:

$$\text{Weight space}=k\_size*k\_size*numPU*2$$

To achieve high performance and hide external memory latency, our scheduling schemes overlap the external memory communication with convolution layer execution through use of double buffering. The following descriptions provide insight on the execution times for each of the considered scheduling schemes in this patent.

Scheduling Scheme One

This scheduling scheme processes numPU number of input FM while generating one output FM. A given output FM is generated in units of row and therefore the process of loading/storing the output FM from/to SM is also carried out at the granularity of rows. The process of generating the output FM row can be carried in parallel to the process of loading and storing output FM rows. These steps are repeated out_y times to generate the output FM. While processing one output FM, scheduling scheme loads numPU number of input FMs external memory in parallel. For each numPU number of input FM, all outFM FM are processed. The following equations can be used to estimate the convolution execution time:

$$\text{output row time}=sm\_to\_input\_buffer\_time\\(stride\_size, numPU)+(do\_conv\_latency\\(k\_size)+do\_sum\_latency( ))*out\_x+\\2*sm\_to\_output\_buffer\_time(out\_x)$$

$$\text{output row load and store}\\time=external\_memoryread\_latency(out\_x)+\\external\_memory\_write\_latency(out\_x)$$

The process of loading and storing output rows and generating output rows is carried out in parallel and therefore the pipeline latency can be calculated as follows:

$$\text{row pipeline latency time}=MAX(\text{output row time},\\\text{output row load and store time})$$

The process of generating output FMs and bringing next set of weights from external memory happens in parallel as follows:

$$\text{output FM pipeline latency}=MAX(weight\_load\_time\\(numPU, k\_size), row\ pipeline\ latency*out\_y)$$

The process of processing a set of input FMs and loading next set of input FM is performed in parallel as follows.

input FM processing pipeline latency=
   MAX(input_load_time(numPU, in_x,in_y), output FM pipeline latency*outFM)

layer execution time=input FM processing pipeline latency*inFM/numPU

Scheduling Scheme Two

This scheduling scheme processes the input FMs at the granularity of band of size k_size*in_x. While processing input FM bands, the scheduler loads next set of input FM bands from external memory to on-chip SM. In total, this process is repeated out_y times to fully process number of input FMs in parallel based on the number of available processing units for execution (ie. numPU). Once numPU input FMs are processed, the scheduling scheme moves to next set of input FM and this is repeated inFM/NumPU times. The end result is the generation of one output FM. While the current output FM is being generated, the previously generated output FM is stored back to external memory. The following set of equations can be used to estimate the execution time of layer.

output row time=sm_to_input_buffer_time (numPU, stride_size, in_x)+(do_conv_latency($k$_size)+ do_sum_latency( ))*out_x+2*sm_to_output_buffer_time (stride_size, out_x)

where "output row time" refers to the time taken to output a row after execution, "sm_to_input_buffer_time( )" function returns the time to move the data from the SM to the input buffer given the numPU, stride_size and the in_x as inputs, "do_conv_latency( )" function returns the time to perform the convolution operation given the k_ size, "do_sum_latency( )" function returns the time to perform the summation and "sm_to_output_buffer_time( )" function returns the time to store the data from the SM to the output buffer given the inputs stride_size and out_x.

band load time=external_memory_latency(stride_size, in_x)

where "band load time" refers to the time required to load the band from the external memory, which is returned by the "external_memory_latency( )" function provided the stride_size and in_x.

The process of loading the input band and processing input band is carried out in parallel and therefore the pipeline latency can be calculated as the maximum of the "output row time" and the "band load time" as follows:

pipeline latency time=MAX(output row time, band load time)

The following assumption are made for the next step:

weight load time<<input FM set process time output FM store time<<all input FMs process time where the "weight load time" refers to the time taken to load the weight from the external memory and "input FM set process time" is the time taken to process the set of input FMs. The "output FM store time" refers to the time required to store the processed output FM and "all input FMs process time" refers to the time taken to process all the input FMs in a layer. The assumptions above are based on fact that the size of weights is smaller than the size of numPU number of input FM processed, and, the size of one output FM is much smaller than the size of inFM number of input FM. Now we can define our output FM process time and layer execution time by:

output FM time=pipeline latency time*out_y*inFM/numPU layer execution time=output FM time*outFM where the "output FM time" refers to the time taken to output an output FM and "pipeline latency time" refers to the time when parallelising load and store. "layer execution time" refers to the overall execution time of the layer.

Scheduling Scheme Three

This scheduling scheme processes one complete input FM while generating multiple partial output FMs at the granularity of rows. While processing the current input FM, the scheduling scheme loads the output FMs from external memory in a unit of rows. numPU number of output FM rows are generated in parallel and then stored back. The process of loading next set of output FM rows, processing the current set of output FM rows and storing the previous set of FM rows is executed in parallel. It takes outFM/numPU steps to completely use one input FM and partially generate all output FMs. While processing the current input FM, the scheduler loads the next input FM from external memory to on-chip SM. The equations for estimating the execution time of this scheduling scheme are provided below:

output row time=sm_to_input_buffer_time(stride_size, in_x)+(do_conv_and_sum_latency(k_size)*out_x+2*sm_to_output_buffer_time(out_x,numPU)

where "output row time" refers to the time taken to output a row after execution, "sm_to_input_buffer_time( )" function returns the time to move the data from the SM to the input buffer given the stride_size and in_x as inputs, "do_conv_and_sum_latency( )" function returns the time to perform the convolution operation and sum operation given the k_size and "sm_to_output_buffer_time( )" function returns the time to store the data from the SM to the output buffer given the inputs out_x and numPU, output row load and store time=external_memory_read_latency(out_x, numPU)+external_memory_write_latency(out_x, numPU)

The process of loading and storing output rows and generating output rows is carried out in parallel and therefore the pipeline latency can be calculated as follows:

pipeline latency time=X(output row time, output row load and store time)

The following assumption are made for the next step:

weight load time<<output FM set load and store time output FM load time<<all output FMs load time where the "weight load time" is the time required to load the set of weights from the external memory, "output FM set load and store time" is the time required to load a set of output FMs and then store them back after processing, "output FM load time" is the time required to load an output FM from the external memory, and "all output FMs load time" is the time required to load all the output FMs. The assumptions above are based on fact that the size of the weights is much smaller than the size of numPU number of output FM processed, and, the size of one input FM is much smaller than the size of output FM number of output FM. Now the input FM process time and layer execution time are defined as follows:

input FM time=pipeline latency time*out_y*outFM/
numPU layer execution time=input FM time*inFM Scheduling Scheme Four The basic requirement for this scheduling scheme is that the input FMs and output FMs are stored on on-chip SM. Only weights are loaded from external memory. At a given time, numPU number of input FM bands are processed to generate one output FM row. While output FM row is being generated, the weights required for the row of next output FM are loaded from external memory in parallel. The process is repeated for all outFM number of output FMs. Once the current set of input FM bands are processed, the scheduling scheme starts processing next set of input FM bands. After processing inFM/numPU batches of input FM bands, one row from each output FM is completely\ generated. The scheduling scheme then moves these output FM rows from a temporary storage in SM to space used by input FMs in SM. The execution time for convolution layer can be estimated using the following equations.

output row time=sm_to_input_buffer_time (k_size,
in_x, num PU)+(do_conv_latency(k_size)+
do_sum_latency( ))*out_x+2*sm_to_
output_buffer_time(out_x)

weight load time=weight_load_time(numPU,k_size)

The output row operation and weight load operation are overlapped as follows:

output row pipeline latency=MAX(output row time,
weight load time)

The layer execution time is estimated as follows:

$$\text{all output rows latency} = \text{output row pipeline latency} * \frac{inFM}{numPU} + $$

within_SM_load_store(out_x, outFM)

layer execution time=all output rows latency*out_y

LDBS Arrangement 2

Figure 13:
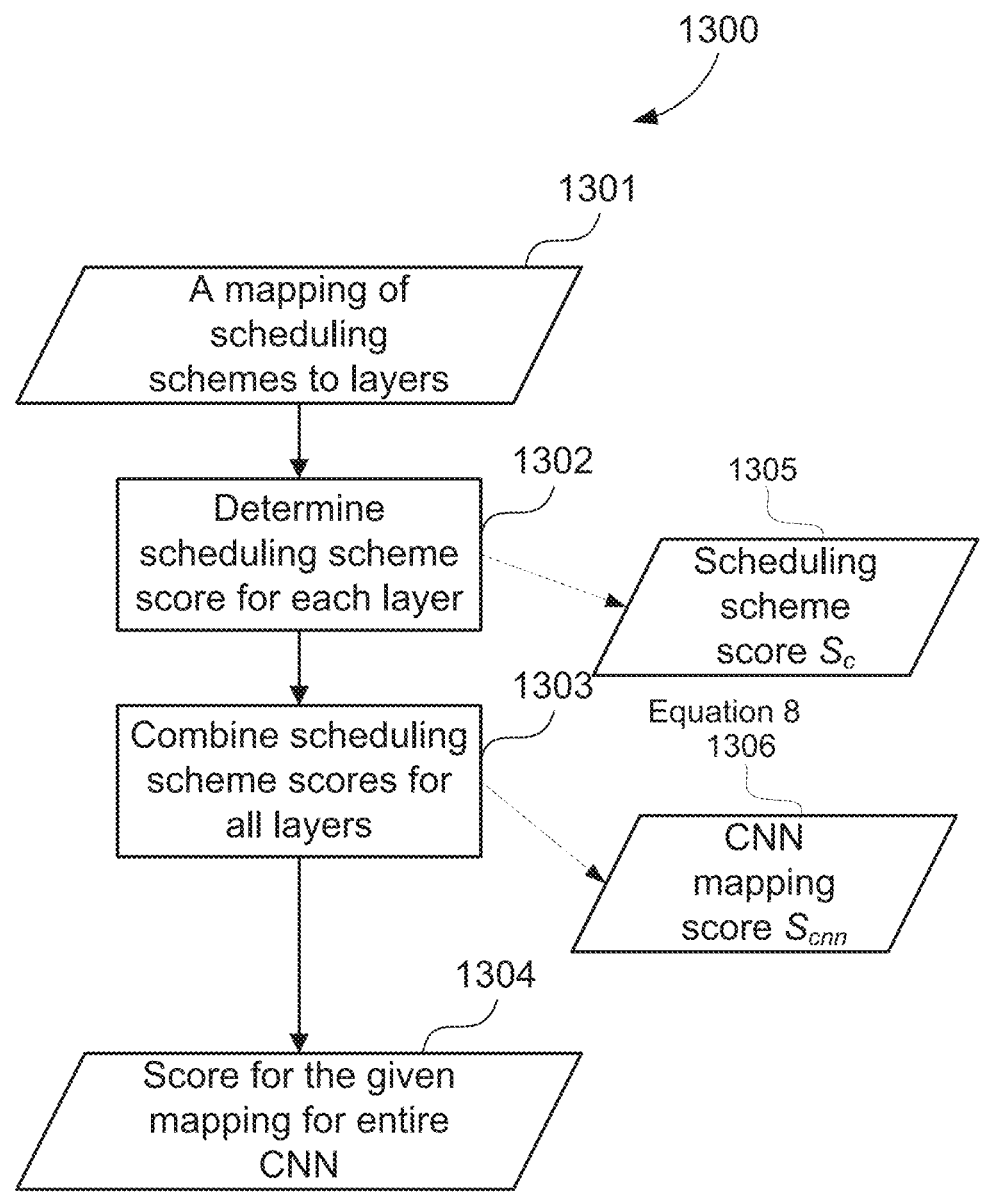
FIG. 13 is a schematic flow diagram illustrating an alternative method for 105 to exhaustively identify the best mapping.

In an alternative LDBS implementation to perform the step 105, all the mapping possibilities are explored exhaustively using a score based estimation method, as depicted by a method 1300 in FIG. 13.

Figure 14:
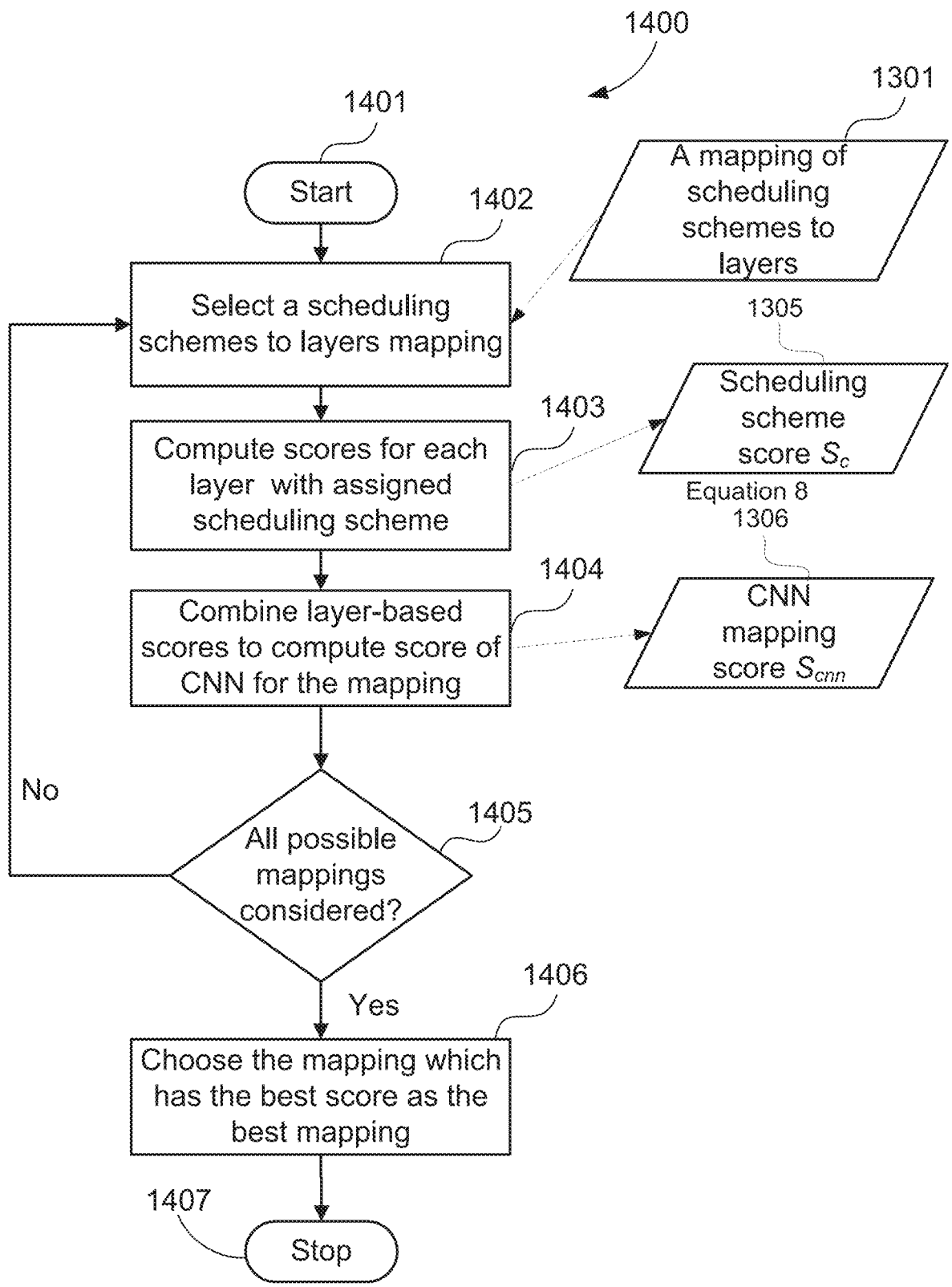
FIG. 14 is a schematic flow diagram illustrating a detailed method of the approach in FIG. 13 to perform 105.

FIG. 13 is a flow diagram depicting an example of an alternative method 1300 for implementing part of the step 105 in FIG. 1 in order to score a particular mapping which can be used, as described in regard to FIG. 14, to exhaustively determine the best mapping. For example, if there are three schedules (H1, H2, H3) in the set 102 of schedules, and five layers (L1, L2, L3, L4, L5) in the CNN algorithm 1703, there are 3^5=243 mapping possibilities. A first step 1301, performed by the processor 1205 as directed by the LDBS software 1233, is a particular mapping of scheduling schemes to layers of the CNN algorithm, specified by the designer. For example, the schedules H1, H2, H3, H1, H3 are to be mapped to layers L1, L2, L3, L4 and L5 respectively. A following step 1302, performed by the processor 1205 as directed by the LDBS software 1233, determines scheduling scheme scores 1305 for each layer for the associated scheduling scheme specified by the mapping 1301. The scheduling scheme scores 1305 are combined across layers in a following step 1303, performed by the processor 1205 as directed by the LDBS software 1233, using Equation 8 for a preferred implementation to form a CNN mapping score $S_{cnn}$ (ie 1306) as follows:

$$\text{CNN Score for a mapping, } S_{cnn} = \sum_{i=1}^{M} Sc^i \qquad 8$$

where: $Sc^i$ represents the scheduling scheme score (formulated in Equation 6 and 7) of the $i^{th}$ layer; The individual scores per layer are added from layers 1 to M, with M number of layers in the CNN algorithm 1703 to compute the CNN score for mapping $S_{cnn}$.

Equation 8 sums individual scheduling scheme scores across M layers (where M=5 in the present example) to determine the CNN score, $S_{cnn}$, for the mapping in question 1301. An alternate LDBS implementation could use the maximum or minimum individual mapping scores or any other statistical means to combine the individual scheduling schemes across layers to obtain the CNN score.

FIG. 14 is a flow diagram depicting an example of a method 1400 which utilises the approach depicted in FIG. 13 in order to implement the process 105. The process 105 is concerned with determining a scheduling scheme per layer of the CNN algorithm. FIG. 14 illustrates a preferred method 1400 for determining the best set of scheduling schemes for the entire CNN algorithm including all layers, using an exhaustive approach. The method 1400 starts at a step 1401, performed by the processor 1205 as directed by the LDBS software 1233, after which a following step 1402, performed by the processor 1205 as directed by the LDBS software 1233, selects a particular mapping (depicted as the mapping 1301 for the sake of illustration), which selects scheduling schemes to layers of the CNN algorithm.

A following step 1403, performed by the processor 1205 as directed by the LDBS software 1233, determines individual scheduling scheme scores $S_C$ (depicted as the scores 1305 for illustration) for each layer of the CNN algorithm and a following step 1404, performed by the processor 1205 as directed by the LDBS software 1233, combines the scheduling scheme scores across all layers of the CNN algorithm to determine the CNN score $S_{cnn}$ (depicted as the score 1306 for illustration), using the formulation in Equation 8. If not all the possible mappings have been considered, a decision step 1405 passes control back to the step 1402 and the steps 1402-1404 are iterated until all the mapping possibilities have been considered. Once all the mapping possibilities are considered, the decision step 1405 passes control to a step 1406 which selects the mapping 1304 with the best score as the best mapping for the CNN algorithm in question. One possible measure that can be used by the step 1406 is to select the mapping with the largest CNN mapping score 1306. The method 1400 terminates at 1407.

Extension to the Design Space Exploration

The memory size, execution time and external memory access estimation models can be used to populate the design space. First the design space can be pruned based on execution time and memory size constraints. The remaining design space will contain the design point with the lowest number of external memory accesses. The design space for the noted problem can also be populated using cycle accurate simulation instead of using performance estimation models. The performance estimation equations simplify some aspects of the system such as higher memory latency due to bus congestion. This can lead to some errors in the design space exploration, resulting in the selection of non-optimal design point. However, the obvious advantage is a significant speed up for overall design space exploration process. One instance of simulation can take up to hours to finish and, with O(M:N) number of simulations required to populate design space, running simulations for all design points is almost impractical. Therefore, system designer face the dilemma of balancing both design time and quality of results. To solve the problem of inaccuracy in the estimation model and to achieve high-quality results, a two-step design space exploration can be used. In the first step, estimation models can be used to narrow down the design space to relatively smaller design space through pruning. For example, all design points where execution time is within a threshold are kept in the design space. Then cycle-accurate simulation can be performed on these points to find the optimal design point. The value of threshold can be decided based on the accuracy of estimation models.

LDBS Arrangement 3

Figure 15:
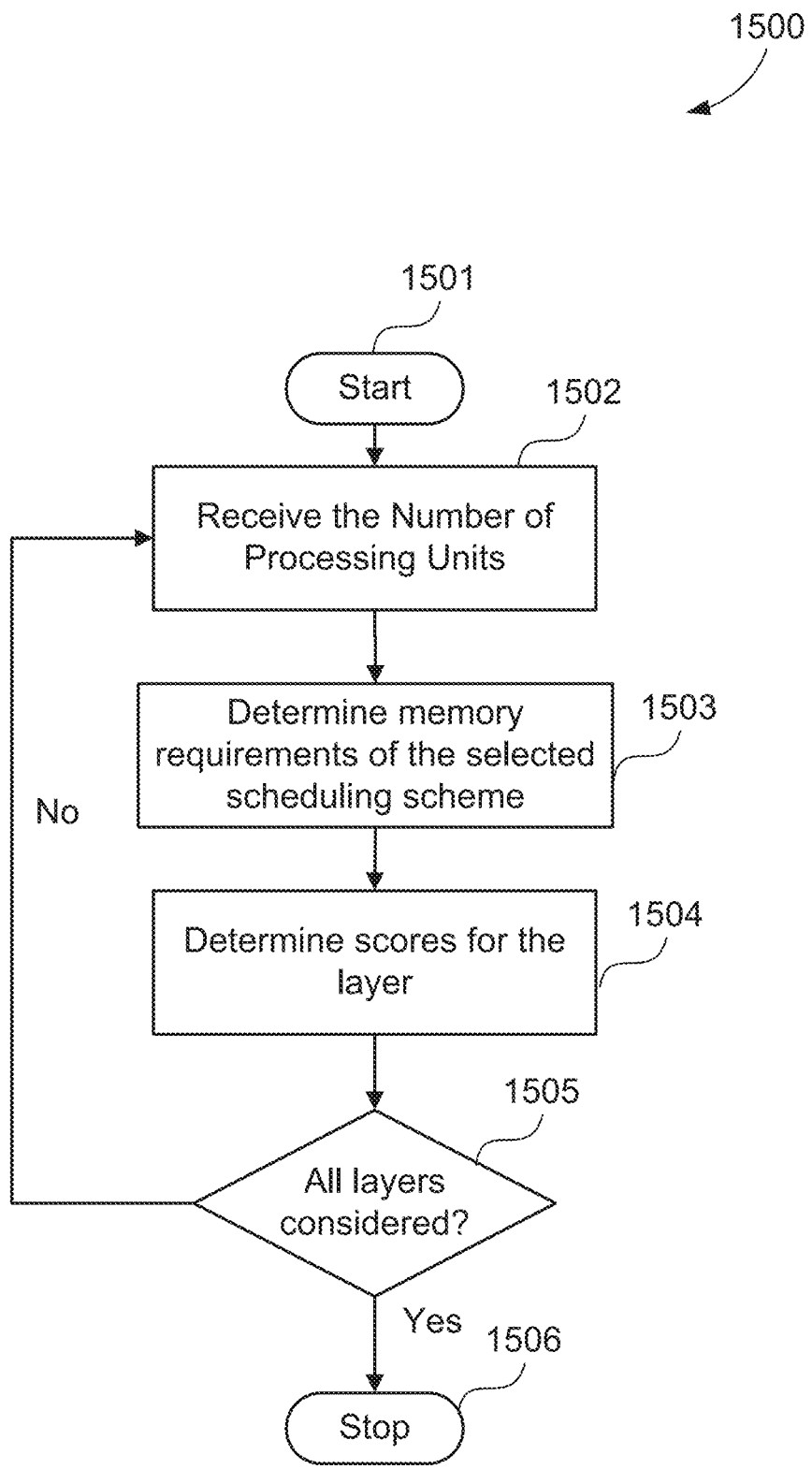
FIG. 15 is a schematic flow diagram illustrating a method to consider differing number of accelerators per layer of the CNN algorithm.

FIG. 15 is a flow diagram depicting an example of a LDBS method 1500 applicable to architectures in which different numbers of accelerators from the SoC are used to execute each layer of the CNN algorithm. In such alternative LDBS implementations, the number of available processing units (PUs) for execution changes for each layer of the CNN algorithm, due for example to considerations for low power, performance, etc. In such arrangements the score computations are updated as depicted in the method 1500. The method 1500 starts at a step 1501, performed by the processor 1205 as directed by the LDBS software 1233, after which a step 1502, performed by the processor 1205 as directed by the LDBS software 1233, receives information specifying the number of available PUs for each layer of the CNN algorithm. A following step 1503, performed by the processor 1205 as directed by the LDBS software 1233, determines memory requirements, where memory sizes are explicitly multiplied by the given number of PUs. Since the input data has to be setup for the provided number of PUs to execute the assigned layer of the CNN algorithm, the amount of input data necessary for execution will depend upon the number of PUs given. For example, if there are two PUs and the input required is one input the memory size will be the input FM size multiplied by two, where as providing three PUs will increase the memory size to input FM size multiplied by three. A following step 1504, performed by the processor 1205 as directed by the LDBS software 1233, determines the scores, such as consumption score and opportunity score, based on the determined memory requirements. A decision step 1505, performed by the processor 1205 as directed by the LDBS software 1233, determines if all layers have been considered, and if not control follows a NO arrow to the step 1502 and the steps 1502-1504 are iterated until all the layers are considered. Thereafter, the method 1500 terminates at a step 1506 as directed by the decision step 1505.

LDBS Arrangement 4

In an alternative LDBS implementation, the free space available in the allocated local memory (Lconst) for the next layer is predicted so that additional input data can be pre-fetched using the DMA component (508), to improve the execution time. The consumption score computation of Equation 2 is modified by adding a predicted free space to So,l as shown in Equation 9.

Consumption Score of a scheduling scheme, $E = (S_{o,l} + S_f)/S_i$ (9)

where: $S_{o,l}$ is the output space required to execute the curre layer of the CNN algorithm; $S_f$ is the predicted free space in the allocated local memory; $S_i$, the amount of input data required to start the execution of the scheduling scheme for the next layer. The consumption score of a scheduling scheme E is formulated by adding the predicted free space $S_f$ with the output space $S_{o,l}$ and divide that by the input space required $S_i$.

Figure 16:
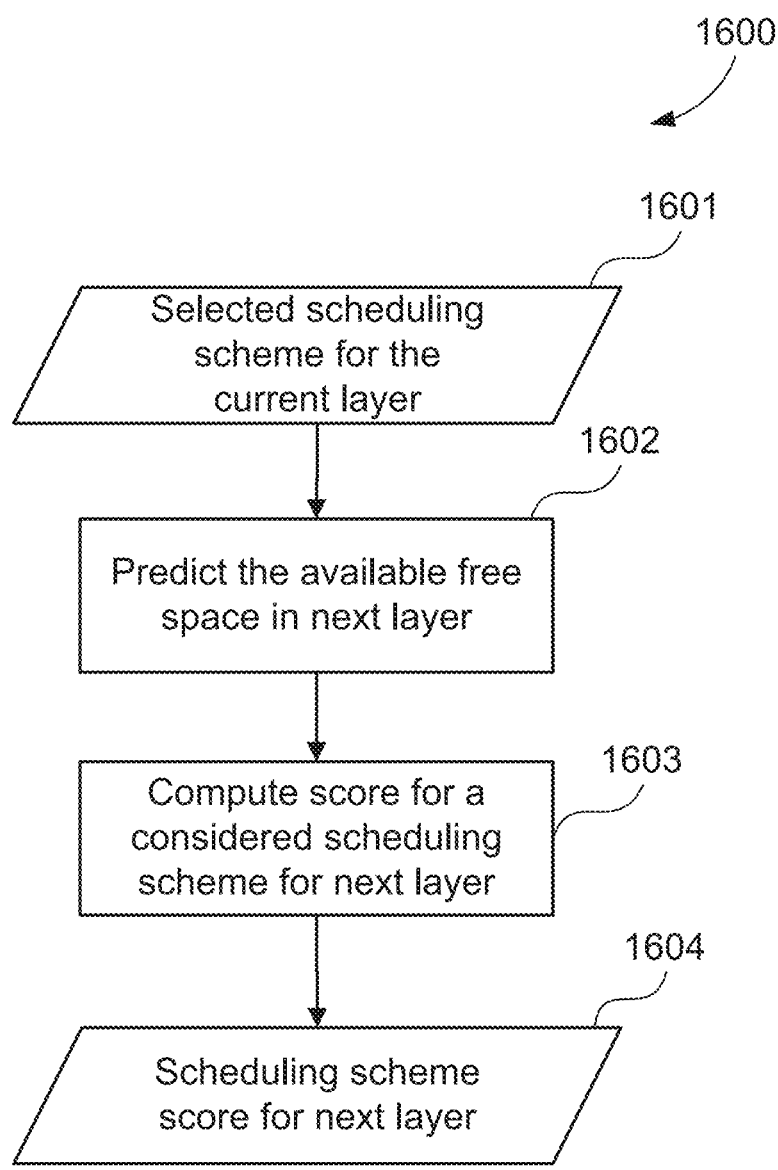
FIG. 16 is a schematic flow diagram illustrating a method to predict the free space to further improve the scores of the scheduling schemes.

FIG. 16 is a schematic flow diagram illustrating an example of a method 1600 to predict free memory space in order to further improve the performance of the scheduling schemes. The method 1600 determines the scheduling scheme score $S_C$ for a next layer based on predicted free space as well as shown in Equation 9. The free space will be predicted when the output data becomes smaller when processing a CNN algorithm layer compared to processing the previous layer. This free space can be utilised for more input data in the allocated memory, which will improve the execution time of execution (ie. the more data available in local memory the lesser need to bring data from the external memory). The DMA unit in 508 can be utilised to prefetch more input data to fill the free space. A selected scheduling scheme 1601 for a current layer is received, and a following step 1602, performed by the processor 1205 as directed by the LDBS software 1233, estimates the available free space in the local memory (such as 507, 1710) when processing a next layer. A following step 1603, performed by the processor 1205 as directed by the LDBS software 1233, determines scheduling scheme scores $S_C$ for the next layer using the updated formulations, such as Equation 9, to produce the scheduling scheme score for the next layer 1604.

INDUSTRIAL APPLICABILITY

The arrangements described are applicable to the computer and data processing industries and particularly for the image processing industry.

The foregoing describes only some embodiments of the present invention, and modifications and/or changes can be made thereto without departing from the scope and spirit of the invention, the embodiments being illustrative and not restrictive.

The invention claimed is:

1. A method of configuring a multi-accelerator System-on-Chip (SoC) to execute a Convolutional Neural Network (CNN), the method comprising the steps of:
  (i) receiving a plurality of scheduling schemes each specifying a sequence of operations executable by Processing Units (PUs) of the SoC;
  (ii) selecting, from the plurality of scheduling schemes, a scheduling scheme for a current layer of the CNN;
  (iii) determining, for the current layer of the CNN, a current state of memory for a storage location in the SoC allocated for storing feature map data from the CNN;
  (iv) selecting, from the plurality of scheduling schemes and dependent upon the scheduling scheme for the current layer of the CNN, a set of candidate scheduling schemes for a next layer of the CNN; and
  (v) selecting, from the set of candidate scheduling schemes dependent upon the determined current state of memory, a scheduling scheme for the next layer of the CNN; wherein the selected scheduling scheme for the current layer of the CNN and the selected scheduling scheme for the next layer of the CNN enable configuration of the SoC for execution of the CNN.

2. A method according to claim 1 comprising the further steps of:
substituting the scheduling scheme for the next layer of the CNN for the scheduling scheme for the current layer of the CNN; and
repeating the steps (iii)-(v) in relation to a subsequent layer of the CNN.

3. A method according to claim 2 comprising the further steps of:
repeating the substituting and the repeating steps until scheduling schemes have been selected for all the layers of the CNN thereby enabling configuration of the SoC for execution of the CNN, said selected scheduling schemes forming a configuration set of scheduling schemes each scheduling scheme in the configuration set being associated with a corresponding layer of the CNN;
programming a controller of the SoC with the configuration set of scheduling schemes;
assigning, by the controller, operations from the configuration set of scheduling schemes to PUs of the SoC; and
executing the operations by the PUs to thereby execute the CNN.

4. A method according to claim 1, wherein the step of determining for the current layer of the CNN a current state of memory for a storage location in the SoC allocated for storing feature map data from the CNN comprises the steps of:
determining an amount of local storage allocated to the current layer of the CNN;
determining the amount of local storage required for executing the current layer of the CNN as specified by the selected scheduling scheme;
determining the available local memory space for executing the current layer of the CNN dependent upon the allocated local storage and the required local storage; and
determining the current state of memory dependent upon the available local memory space.

5. A method according to claim 4, wherein the current state of memory is further dependent upon available space in a memory external to the SoC.

6. A method according to claim 1, wherein the step of selecting from the plurality of scheduling schemes a scheduling scheme for a current layer of the CNN comprises the steps of:
pruning the plurality of scheduling schemes by removing scheduling schemes from the set which require more storage than the amount of local storage allocated in the SoC to execute the current layer of the CNN, to thereby form a $1^{st}$ set of pruned schemes.

7. A method according to claim 6 comprising the further steps of:
pruning the $1^{st}$ set of pruned schemes by removing pairs of scheduling schemes from the set which have incompatible memory access operations, to thereby form a $2^{nd}$ set of pruned schemes.

8. A method according to claim 7 comprising the further steps of:
determining scheduling scheme scores for remaining candidate scheduling schemes; and
selecting a scheduling scheme with the best scheduling scheme score as the scheduling scheme for the current layer of the CNN.

9. A method according to claim 8, comprising the further steps of:
determining the scheduling scheme scores dependent upon the available local memory space for executing the current layer of the CNN and an amount of input data required to start the execution of the scheduling scheme for the next layer of the CNN.

10. A method according to claim 9, comprising the further steps of:
determining the scheduling scheme scores dependent upon an amount of data reused in local memory.

11. A method according to claim 10, comprising the further steps of:
determining the scheduling scheme scores dependent upon estimated free space in the local memory.

12. A method according to claim 4, wherein the current state of memory is further dependent upon the number of PUs available in the SoC to execute the current layer of the CNN.

13. A method according to claim 1, wherein the step of selecting a set of candidate scheduling schemes for a next layer of the CNN is further dependent upon the amount of local storage allocated to the current layer of the CNN.

14. A method according to claim 1, wherein the step of selecting a set of candidate scheduling schemes for a next layer of the CNN is further dependent upon a predetermined permissible maximum number of accesses to external memory.

15. A method according to claim 1, wherein the step of selecting a set of candidate scheduling schemes for a next layer of the CNN is further dependent upon a predetermined permissible maximum execution time for executing the CNN algorithm.

16. A method of configuring a multi-accelerator System-on-Chip (SoC) to execute a Convolutional Neural Network (CNN), the method comprising:
receiving a plurality of scheduling schemes, each of the scheduling schemes defining a sequence of operations to execute a layer of a CNN;
determining a current state of memory of the SoC, the current state being a storage location of feature map data for a current layer of the CNN;
determining candidate scheduling schemes for a next layer of the CNN, the candidate scheduling schemes being a subset of the plurality of scheduling schemes for use with the next layer of the CNN;
selecting a scheduling scheme from the candidate scheduling schemes according to the determined current state of the memory; and
configuring the SoC to execute the next layer of the CNN according to the selected scheduling schemes.

17. An apparatus for configuring a multi-accelerator System-on-Chip (SoC) to execute a Convolutional Neural Network (CNN) algorithm, the apparatus comprising:
a processor; and
a memory storing a program for directing the processor to perform a method comprising the steps of:
(i) receiving a plurality of scheduling schemes each specifying a sequence of operations executable by Processing Units (PUs) of the SoC;
(ii) selecting, from the plurality of scheduling schemes, a scheduling scheme for a current layer of the CNN;
(iii) determining, for the current layer of the CNN, a current state of memory for a storage location in the SoC allocated for storing feature map data from the CNN;

(iv) selecting, from the plurality of scheduling schemes and dependent upon the scheduling scheme for the current layer of the CNN, a set of candidate scheduling schemes for a next layer of the CNN; and (v) selecting, from the set of candidate scheduling schemes dependent upon the determined current state of memory, a scheduling scheme for the next layer of the CNN; wherein the selected scheduling scheme for the current layer of the CNN and the selected scheduling scheme for the next layer of the CNN enable configuration of the SoC for execution of the CNN.

18. A computer readable non-transitory storage medium storing a program for directing a processor to perform a method for configuring a multi-accelerator System-on-Chip (SoC) to execute a Convolutional Neural Network (CNN) algorithm, the program comprising:

(i) computer executable code for receiving a plurality of scheduling schemes each specifying a sequence of operations executable by Processing Units (PUs) of the SoC;

(ii) computer executable code for selecting, from the plurality of scheduling schemes, a scheduling scheme for a current layer of the CNN;

(iii) computer executable code for determining, for the current layer of the CNN, a current state of memory for a storage location in the SoC allocated for storing feature map data from the CNN;

(iv) computer executable code for selecting, from the plurality of scheduling schemes and dependent upon the scheduling scheme for the current layer of the CNN, a set of candidate scheduling schemes for a next layer of the CNN; and (v) computer executable code for selecting, from the set of candidate scheduling schemes dependent upon the determined current state of memory, a scheduling scheme for the next layer of the CNN; wherein the selected scheduling scheme for the current layer of the CNN and the selected scheduling scheme for the next layer of the CNN enable configuration of the SoC for execution of the CNN.

19. A method of processing a Convolutional Neural Network (CNN) using a multi-accelerator System-on-Chip (SoC), the method comprising the steps of:

(i) receiving a plurality of scheduling schemes each specifying a sequence of operations executable by Processing Units (PUs) of the SoC;

(ii) selecting, from the plurality of scheduling schemes, a scheduling scheme for a current layer of the CNN;

(iii) determining, for the current layer of the CNN, a current state of memory for a storage location allocated to the current layer of the CNN for storing feature map data from the CNN;

(iv) selecting, from the plurality of scheduling schemes and dependent upon the scheduling scheme for the current layer of the CNN, a set of candidate scheduling schemes for a next layer of the CNN;

(v) selecting, from the candidate scheduling schemes dependent upon the determined current state of memory for the current layer, a scheduling scheme for the next layer of the CNN;

(vi) substituting the scheduling scheme for the next layer of the CNN for the scheduling scheme for the current layer of the CNN;

(vii) repeating the steps (iii)-(vi) until scheduling schemes have been selected for all the layers of the CNN thereby enabling execution of the CNN, said selected scheduling schemes forming a configuration set of scheduling schemes each scheduling scheme in the configuration set being associated with a corresponding layer of the CNN;

(vii) programming a controller on the SoC with the configuration set of scheduling schemes;

(viii) assigning, by the controller, operations from the configuration set of scheduling schemes to PUs of the SoC; and (ix) executing the operations by the PUs to thereby execute the CNN algorithm.

* * * * *